(12) United States Patent
Mishev et al.

(10) Patent No.: US 9,134,454 B2
(45) Date of Patent: Sep. 15, 2015

(54) METHOD AND SYSTEM FOR FINITE VOLUME SIMULATION OF FLOW

(75) Inventors: Ilya D. Mishev, Houston, TX (US); Olivier Dubois, Pointe-Claire (CA); Lijian Jiang, Los Alamos, NM (US)

(73) Assignee: ExxonMobil Upstream Research Company, Houston, TX (US)

(*) Notice: Subject to any disclaimer, the term of this patent is extended or adjusted under 35 U.S.C. 154(b) by 243 days.

(21) Appl. No.: 13/641,071

(22) PCT Filed: Jan. 20, 2011

(86) PCT No.: PCT/US2011/021869
§ 371 (c)(1),
(2), (4) Date: Oct. 12, 2012

(87) PCT Pub. No.: WO2011/136861
PCT Pub. Date: Nov. 3, 2011

(65) Prior Publication Data
US 2013/0035913 A1 Feb. 7, 2013

Related U.S. Application Data

(60) Provisional application No. 61/330,012, filed on Apr. 30, 2010.

(51) Int. Cl.
*G06G 7/48* (2006.01)
*G06G 7/50* (2006.01)
(Continued)

(52) U.S. Cl.
CPC ................ *G01V 11/00* (2013.01); *E21B 43/00* (2013.01)

(58) Field of Classification Search
CPC . G06F 17/5009; G06F 2217/16; G01V 11/00; G01V 2210/1234; E21B 43/00; E21B 49/00; E21B 43/164; E21B 43/166; E21B 43/168; E21B 43/40

USPC ......................... 703/9, 10; 166/266
See application file for complete search history.

(56) References Cited

U.S. PATENT DOCUMENTS 5,537,320 A   7/1996   Simpson et al.
5,671,136 A   9/1997   Willhoit, Jr.
(Continued)

FOREIGN PATENT DOCUMENTS

WO    99/28767        6/1999
WO    2007/022289     2/2007
(Continued)

OTHER PUBLICATIONS

Aarnes, Jorg Espen, et al., "Coarsening of three-dimensional structured and unstructured grids for subsurface flow", *Science Direct Advances in Water Resources 30* (2007) pp. 2177-2193.
(Continued)

*Primary Examiner* — Kamini S Shah
*Assistant Examiner* — Andre Pierre Louis
(74) *Attorney, Agent, or Firm* — ExxonMobil Upstream Research Company, Law Dept.

(57) ABSTRACT

There is provided a method for modeling a hydrocarbon reservoir that includes deriving a computational mesh on a fine unstructured mesh using a multilevel mixed multiscale finite volume (MMMFV) method. Deriving the computational mesh includes computing a first algebraic multilevel basis function for a pressure, constructing an interaction region, and generating a primary mesh. A second algebraic multiscale basis function for a velocity approximation is computed and the primary mesh is discretized. The hydrocarbon reservoir is simulated using the computational mesh. A data representation of a physical hydrocarbon reservoir is generated in a non-transitory, computer-readable, medium based at least in part on the results of the simulation.

21 Claims, 18 Drawing Sheets

(51) Int. Cl.
*G01V 11/00* (2006.01)
*E21B 43/00* (2006.01)

(56) References Cited

U.S. PATENT DOCUMENTS

| | | | |
|---|---|---|---|
| 5,706,194 A | 1/1998 | Neff et al. |
| 5,710,726 A | 1/1998 | Rowney et al. |
| 5,747,673 A | 5/1998 | Ungerer et al. |
| 5,838,634 A | 11/1998 | Jones et al. |
| 5,844,799 A | 12/1998 | Joseph et al. |
| 5,953,680 A | 9/1999 | Divies et al. |
| 5,992,519 A | 11/1999 | Ramakrishnan et al. |
| 6,018,498 A | 1/2000 | Neff et al. |
| 6,052,520 A | 4/2000 | Watts, III |
| 6,106,561 A | 8/2000 | Farmer |
| 6,128,577 A | 10/2000 | Assa et al. |
| 6,128,579 A | 10/2000 | McCormack et al. |
| 6,138,076 A | 10/2000 | Graf et al. |
| 6,230,101 B1 | 5/2001 | Wallis |
| 6,374,185 B1 | 4/2002 | Taner et al. |
| 6,480,790 B1 | 11/2002 | Calvert et al. |
| 6,549,854 B1 | 4/2003 | Malinverno et al. |
| 6,597,995 B1 | 7/2003 | Cornu et al. |
| 6,662,146 B1 | 12/2003 | Watts |
| 6,664,961 B2 | 12/2003 | Ray et al. |
| 6,823,296 B2 | 11/2004 | Rey-Fabret et al. |
| 6,826,483 B1 | 11/2004 | Anderson et al. |
| 6,826,520 B1 | 11/2004 | Khan et al. |
| 6,826,521 B1 | 11/2004 | Hess et al. |
| 6,839,632 B2 | 1/2005 | Grace |
| 6,901,391 B2 | 5/2005 | Storm, Jr. et al. |
| 6,940,507 B2 | 9/2005 | Repin et al. |
| 6,980,940 B1 | 12/2005 | Gurpinar et al. |
| 6,987,878 B2 | 1/2006 | Lees et al. |
| 7,043,367 B2 | 5/2006 | Granjeon |
| 7,069,149 B2 | 6/2006 | Goff et al. |
| 7,089,166 B2 | 8/2006 | Malthe-Sorenssen et al. |
| 7,096,122 B2 | 8/2006 | Han |
| 7,096,172 B2 | 8/2006 | Colvin et al. |
| 7,177,787 B2 | 2/2007 | Rey-Fabret et al. |
| 7,191,071 B2 | 3/2007 | Kfoury et al. |
| 7,254,091 B1 | 8/2007 | Gunning et al. |
| 7,277,796 B2 | 10/2007 | Kuchuk et al. |
| 7,280,952 B2 | 10/2007 | Butler et al. |
| 7,286,972 B2 | 10/2007 | Maker |
| 7,363,163 B2 | 4/2008 | Valec-Dupin et al. |
| 7,369,980 B2 | 5/2008 | Deffenbaugh et al. |
| 7,376,539 B2 | 5/2008 | Lecomte |
| 7,379,853 B2 | 5/2008 | Middya |
| 7,379,854 B2 | 5/2008 | Calvert et al. |
| 7,406,878 B2 | 8/2008 | Rieder et al. |
| 7,412,363 B2 | 8/2008 | Callegari |
| 7,415,401 B2 | 8/2008 | Calvert et al. |
| 7,424,415 B2 | 9/2008 | Vassilev |
| 7,433,786 B2 | 10/2008 | Adams |
| 7,451,066 B2 | 11/2008 | Edwards et al. |
| 7,467,044 B2 | 12/2008 | Tran et al. |
| 7,478,024 B2 | 1/2009 | Gurpinar et al. |
| 7,480,205 B2 | 1/2009 | Wei |
| 7,486,589 B2 | 2/2009 | Lee et al. |
| 7,496,488 B2 | 2/2009 | Jenny et al. |
| 7,516,056 B2 | 4/2009 | Wallis et al. |
| 7,523,024 B2 | 4/2009 | Endres et al. |
| 7,526,418 B2 | 4/2009 | Pita et al. |
| 7,539,625 B2 | 5/2009 | Klumpen et al. |
| 7,542,037 B2 | 6/2009 | Fremming |
| 7,548,840 B2 | 6/2009 | Saaf |
| 7,577,527 B2 | 8/2009 | Velasquez |
| 7,584,081 B2 | 9/2009 | Wen et al. |
| 7,596,056 B2 | 9/2009 | Keskes et al. |
| 7,603,265 B2 | 10/2009 | Mainguy et al. |
| 7,606,691 B2 | 10/2009 | Calvert et al. |
| 7,617,082 B2 | 11/2009 | Childs et al. |
| 7,620,800 B2 | 11/2009 | Huppenthal et al. |
| 7,634,395 B2 * | 12/2009 | Flandrin et al. ............... 703/10 |
| 7,640,149 B2 | 12/2009 | Rowan et al. |
| 7,657,494 B2 | 2/2010 | Wilkinson et al. |
| 7,672,825 B2 | 3/2010 | Brouwer et al. |
| 7,684,929 B2 | 3/2010 | Prange et al. |
| 7,706,981 B2 | 4/2010 | Wilkinson et al. |
| 7,711,532 B2 | 5/2010 | Dulac et al. |
| 7,716,029 B2 | 5/2010 | Couet et al. |
| 7,739,089 B2 | 6/2010 | Gurpinar et al. |
| 7,752,023 B2 | 7/2010 | Middya |
| 7,756,694 B2 | 7/2010 | Graf et al. |
| 7,783,462 B2 | 8/2010 | Landis, Jr. et al. |
| 7,796,469 B2 | 9/2010 | Keskes et al. |
| 7,809,537 B2 | 10/2010 | Hemanthkumar et al. |
| 7,809,538 B2 | 10/2010 | Thomas |
| 7,822,554 B2 | 10/2010 | Zuo et al. |
| 7,844,430 B2 | 11/2010 | Landis, Jr. et al. |
| 7,860,654 B2 | 12/2010 | Stone |
| 7,869,954 B2 | 1/2011 | Den Boer et al. |
| 7,877,246 B2 | 1/2011 | Moncorge et al. |
| 7,878,268 B2 | 2/2011 | Chapman et al. |
| 7,920,970 B2 | 4/2011 | Zuo et al. |
| 7,925,481 B2 | 4/2011 | Van Wagoner et al. |
| 7,932,904 B2 | 4/2011 | Branets et al. |
| 7,933,750 B2 | 4/2011 | Morton et al. |
| 7,953,585 B2 | 5/2011 | Gurpinar et al. |
| 7,970,593 B2 | 6/2011 | Roggero et al. |
| 7,986,319 B2 | 7/2011 | Dommisse |
| 7,991,600 B2 | 8/2011 | Callegari |
| 7,996,154 B2 | 8/2011 | Zuo et al. |
| 8,005,658 B2 | 8/2011 | Tilke et al. |
| 8,050,892 B2 | 11/2011 | Hartman |
| 8,078,437 B2 | 12/2011 | Wu et al. |
| 8,095,345 B2 | 1/2012 | Hoversten |
| 8,095,349 B2 | 1/2012 | Kelkar et al. |
| 8,145,464 B2 | 3/2012 | Arengaard et al. |
| 8,190,405 B2 | 5/2012 | Appleyard |
| 8,204,726 B2 | 6/2012 | Lee et al. |
| 8,204,727 B2 | 6/2012 | Dean et al. |
| 8,209,202 B2 | 6/2012 | Narayanan et al. |
| 8,212,814 B2 | 7/2012 | Branets et al. |
| 8,249,842 B2 | 8/2012 | Ghorayeb et al. |
| 8,255,195 B2 | 8/2012 | Yogeswaren |
| 8,271,248 B2 | 9/2012 | Pomerantz et al. |
| 8,275,589 B2 | 9/2012 | Montaron et al. |
| 8,275,593 B2 | 9/2012 | Zhao |
| 8,280,635 B2 | 10/2012 | Ella et al. |
| 8,280,709 B2 | 10/2012 | Koutsabeloulis et al. |
| 8,285,532 B2 | 10/2012 | Zangl et al. |
| 8,301,426 B2 | 10/2012 | Abasov et al. |
| 8,301,429 B2 | 10/2012 | Hajibeygi et al. |
| 8,315,845 B2 | 11/2012 | Lepage |
| 8,335,677 B2 | 12/2012 | Yeten et al. |
| 8,339,396 B2 | 12/2012 | Williams et al. |
| 8,350,851 B2 | 1/2013 | Flew et al. |
| 8,359,184 B2 | 1/2013 | Massonnat |
| 8,359,185 B2 | 1/2013 | Pita et al. |
| 8,374,974 B2 | 2/2013 | Chen et al. |
| 8,386,227 B2 | 2/2013 | Fung et al. |
| 8,401,832 B2 | 3/2013 | Ghorayeb et al. |
| 8,412,501 B2 | 4/2013 | Oury et al. |
| 8,412,502 B2 | 4/2013 | Moncorge et al. |
| 8,423,338 B2 | 4/2013 | Ding et al. |
| 8,428,919 B2 | 4/2013 | Parashkevov |
| 8,429,671 B2 | 4/2013 | Wood et al. |
| 8,433,551 B2 | 4/2013 | Fung et al. |
| 8,437,999 B2 | 5/2013 | Pita et al. |
| 8,447,525 B2 | 5/2013 | Pepper |
| 8,452,580 B2 | 5/2013 | Strebelle |
| 8,457,940 B2 | 6/2013 | Xi et al. |
| 8,463,586 B2 | 6/2013 | Mezghani et al. |
| 8,484,004 B2 | 7/2013 | Schottle et al. |
| 8,489,375 B2 | 7/2013 | Omeragic et al. |
| 8,494,828 B2 | 7/2013 | Wu et al. |
| 8,498,852 B2 | 7/2013 | Xu et al. |
| 8,504,341 B2 | 8/2013 | Cullick et al. |
| 8,510,242 B2 | 8/2013 | Al-Fattah |
| 8,515,678 B2 | 8/2013 | Pepper et al. |
| 8,515,720 B2 | 8/2013 | Koutsabeloulis et al. |
| 8,515,721 B2 | 8/2013 | Morton et al. |

(56) References Cited

U.S. PATENT DOCUMENTS

| | | |
|---|---|---|
| 8,521,496 B2 | 8/2013 | Schottle et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,599,643 B2 | 12/2013 | Pepper et al. |
| 8,606,524 B2 | 12/2013 | Soliman et al. |
| 8,612,194 B2 | 12/2013 | Horne et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,674,984 B2 | 3/2014 | Ran et al. |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,700,549 B2 | 4/2014 | Hossain et al. |
| 8,712,746 B2 | 4/2014 | Tillier et al. |
| 8,712,747 B2 | 4/2014 | Cullick et al. |
| 8,718,958 B2 | 5/2014 | Breton et al. |
| 8,718,993 B2 | 5/2014 | Klie |
| 8,731,887 B2 | 5/2014 | Hilliard et al. |
| 8,731,891 B2 | 5/2014 | Sung et al. |
| 8,738,294 B2 | 5/2014 | Ameen |
| 8,762,442 B2 | 6/2014 | Jeong et al. |
| 8,775,141 B2 | 7/2014 | Raphael |
| 8,775,144 B2 | 7/2014 | Han et al. |
| 8,776,895 B2 | 7/2014 | Li et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,778 B2 | 8/2014 | Salazar-Tio et al. |
| 8,818,780 B2 | 8/2014 | Calvert et al. |
| 8,843,353 B2 | 9/2014 | Posamentier et al. |
| 8,855,986 B2 | 10/2014 | Castellini et al. |
| 8,862,450 B2 | 10/2014 | Derfoul et al. |
| 8,874,804 B2 | 10/2014 | AlShaikh et al. |
| 8,898,017 B2 | 11/2014 | Kragas et al. |
| 8,903,694 B2 | 12/2014 | Wallis et al. |
| 8,935,141 B2 | 1/2015 | Ran et al. |
| 2002/0049575 A1 | 4/2002 | Jalali et al. |
| 2004/0176937 A1 | 9/2004 | Jenny et al. |
| 2005/0171700 A1 | 8/2005 | Dean |
| 2006/0122780 A1 | 6/2006 | Cohen et al. |
| 2006/0235667 A1 | 10/2006 | Fung et al. |
| 2006/0269139 A1 | 11/2006 | Keskes et al. |
| 2007/0016389 A1 | 1/2007 | Ozgen |
| 2007/0039732 A1 | 2/2007 | Dawson et al. |
| 2007/0277115 A1 | 11/2007 | Glinsky et al. |
| 2007/0279429 A1 | 12/2007 | Ganzer et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0208539 A1 | 8/2008 | Lee et al. |
| 2008/0234988 A1 | 9/2008 | Chen et al. |
| 2008/0306803 A1 | 12/2008 | Vaal et al. |
| 2009/0071239 A1 | 3/2009 | Rojas et al. |
| 2009/0122061 A1 | 5/2009 | Hammon, III |
| 2009/0248373 A1 | 10/2009 | Druskin et al. |
| 2009/0319242 A1* | 12/2009 | Lee et al. ............ 703/10 |
| 2010/0004908 A1 | 1/2010 | Lunati |
| 2010/0132450 A1 | 6/2010 | Pomerantz et al. |
| 2010/0138196 A1 | 6/2010 | Hui et al. |
| 2010/0161300 A1 | 6/2010 | Yeten et al. |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0115787 A1 | 5/2011 | Kadlec |
| 2011/0161133 A1 | 6/2011 | Staveley et al. |
| 2011/0310101 A1 | 12/2011 | Prange et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 | 8/2012 | Branets et al. |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0035913 A1 | 2/2013 | Mishev et al. |
| 2013/0041633 A1 | 2/2013 | Hoteit |
| 2013/0046524 A1 | 2/2013 | Gathogo et al. |
| 2013/0073268 A1 | 3/2013 | Abacioglu et al. |
| 2013/0085730 A1 | 4/2013 | Shaw et al. |
| 2013/0090907 A1 | 4/2013 | Maliassov |
| 2013/0096890 A1 | 4/2013 | Vanderheyden et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0112406 A1 | 5/2013 | Zuo et al. |
| 2013/0116993 A1 | 5/2013 | Maliassov |
| 2013/0118736 A1 | 5/2013 | Usadi et al. |
| 2013/0124097 A1 | 5/2013 | Thorne |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0166264 A1 | 6/2013 | Usadi et al. |
| 2013/0185033 A1 | 7/2013 | Tompkins et al. |
| 2013/0204922 A1 | 8/2013 | El-Bakry et al. |
| 2013/0231907 A1 | 9/2013 | Yang et al. |
| 2013/0231910 A1 | 9/2013 | Kumar et al. |
| 2013/0245949 A1 | 9/2013 | Abitrabi et al. |
| 2013/0246031 A1 | 9/2013 | Wu et al. |
| 2013/0289961 A1 | 10/2013 | Ray et al. |
| 2013/0304679 A1 | 11/2013 | Fleming et al. |
| 2013/0311151 A1 | 11/2013 | Plessix |
| 2013/0312481 A1 | 11/2013 | Pelletier et al. |
| 2013/0332125 A1 | 12/2013 | Suter et al. |
| 2013/0338985 A1 | 12/2013 | Garcia et al. |
| 2014/0012557 A1 | 1/2014 | Tarman et al. |
| 2014/0201450 A1 | 7/2014 | Haugen |
| 2014/0236558 A1 | 8/2014 | Maliassov |

FOREIGN PATENT DOCUMENTS

| | | |
|---|---|---|
| WO | 2007/116008 | 10/2007 |
| WO | 2009/138290 | 11/2009 |
| WO | 2013/180709 | 12/2013 |
| WO | 2014/051903 | 4/2014 |

OTHER PUBLICATIONS

Aarnes, J.E., et al., "Mixed Multiscale Finite Element Methods Using Limited Global Information", *SIAM Multiscale Model Simul.*, vol. 7, No. 2, (2008), pp. 655-676.

Arbogast, Todd, et al. "Subgrid Upscaling and Mixed Multiscale Finite Elements", *SIAM J. Numer. Anal.*, vol. 44, No. 3, (2006), pp. 1150-1171.

Chen, Zhiming, et al., "A Mixed Multiscale finite Element Method for Elliptic Problems With Oscillating Coefficients", *Mathematics of Computation*, vol. 72, No. 242, (2002), pp. 541-576.

Efendiev, Y., et al., "Accurate Multiscale Finite Element Methods for Two-Phase Flow Simulations", *Journal of Computational Physics* 220 (2006), pp. 155-174.

(56) References Cited

OTHER PUBLICATIONS

Engquist, Weinan E., et al., "The Heterogeneous Multiscale Methods" *Comm. Math. Sci.*, vol. 1, No. 1 (2003), pp. 87-132.
Hou, Thomas Y., et al., "A Multiscale Finite Element Methods for Elliptic Problems in Composite Materials and Porous Media", *Journal of Computational Physics* 134 (1997), pp. 169-189.
Hughes, Thomas J.R.,, et al. "The Variational Multiscale Method—A Paradigm for Computational Mechanics", *Comput. Methods Appl. Mech. Engrg.* 166 (1998), pp. 3-24.
Jenny, P., et al., "Adaptive Fully Implicit Multi-Scale Finite-Volume Method for Multi-Phase Flow and Transport in Heterogeneous Porous Media", *Journal of Computational Physics*, 217 (2006), pp. 627-641.
Jenny, P., et al., "Adaptive Multiscale Finite-Volume Method for Multiphase Flow and Transport in Porous Media", *Multiscale Model. Simul.*, vol. 3, No. 1 (2004), pp. 50-64.
Jenny, P., et al., "Multi-Scale Finite-Volume Method for Elliptic Problems in Subsurface Flow Simulation", *Journal of Computational Physics* 187 (2003), pp. 47-67.
Lambers, James V., et al. "Accurate Local Upscaling With Variable Compact Multipoint Transmissibility Calculations", *Comput Geosci* (2008) 12, pp. 399-416.
Mishev, Ilya D., et al. "A Mixed Finite Volume Method for Elliptic Problems", *Computational Geosciences* 6 (2002), pp. 253-268.
Mishev, Ilya D., "Nonconforming Finite Volume Methods", *Numer. Methods Partial Differential Eq.*, 23 (2007) pp. 1122-1138.
Mlacnik, Martin J., et al. "Unstructed Grid Optimization for Improved Monotonicity of Discrete Solutions of Elliptic Equations With Highly Anisotropic Coefficients", *Journal of Computational Physics* 216 (2006) pp. 337-361.
Trottenberg, U.U., et al. "Appendixes A-A2. Theoretical Basis and Notation", *Multigrid* (2001) pp. 422-432.
Watts, J.W., et al., "A Compositional Formulation of the Pressure and Saturation Equations", *SPE Reservoir Engineering* (May 1986), pp. 243-253.
U.S. Appl. No. 14/461,193, filed Aug. 15, 2014, Casey.
U.S. Appl. No. 62/081,159, filed Nov. 18, 2014, Branets, et al.
U.S. Appl. No. 62/073,465, filed Oct. 31, 2014, Bi, et al.
U.S. Appl. No. 62/033,529, filed Aug. 5, 2014, Casey.
U.S. Appl. No. 62/031,097, filed Jul. 30, 2014, Branets, et al.
Aarnes, J. et al. (2004), "Toward reservoir simulation on geological grid models", $9^{th}$ European Conf. on the Mathematics of Oil Recovery, 8 pgs.
Ahmadizadeh, M., et al., (2007), "Combined Implicit or Explicit Integration Steps for Hybrid Simulation", *Structural Engineering Research Frontiers*, pp. 1-16.
Bortoli, L. J., et al., (1992), "Constraining Stochastic Images to Seismic Data", Geostatistics, Troia, *Quantitative Geology and Geostatistics* 1, 325-338.
Byer, T.J., et al., (1998), "Preconditioned Newton Methods for Fully Coupled Reservoir and Surface Facility Models", *SPE 49001, 1998 SPE Annual Tech. Conf., and Exh.*, pp. 181-188.
Candes, E. J., et al., (2004), "New Tight Frames of Curvelets and Optimal Representations of Objects with $C^2$ Singularities," *Communications on Pure and Applied Mathematics* 57, 219-266.
Chen, Y. et al. (2003), "A coupled local-global upscaling approach for simulating flow in highly heterogeneous formations", *Advances in Water Resources* 26, pp. 1041-1060.
Connolly, P., (1999), "Elastic Impedance," *The Leading Edge* 18, 438-452.
Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.
Donoho, D. L., Hou, X., (2002), "Beamlets and Multiscale Image Analysis," *Multiscale and Multiresolution Methods, Lecture Notes in Computational Science and Engineering* 20, 149-196.
Durlofsky, L.J. (1991), "Numerical Calculation of Equivalent Grid Block Permeability Tensors for Heterogeneous Porous Media", *Water Resources Research* 27(5), pp. 699-708.
Farmer, C.L. (2002), "Upscaling: a review", *Int'l. Journal for Numerical Methods in Fluids* 40, pp. 63-78.
Gai, X., et al., (2005), "A Timestepping Scheme for Coupled Reservoir Flow and Geomechanics in Nonmatching Grids", *SPE 97054, 2005 SPE Annual Tech. Conf. and Exh.*, pp. 1-11.
Haas, A., et al., (1994), "Geostatistical Inversion—A Sequential Method of Stochastic Reservoir Modeling Constrained by Seismic Data," *First Break* 12, 561-569 (1994).
Hesse, M. A., et al (2008), "Compact Multiscale Finite Volume Method for Heterogeneous Anistropic Elliptic Equations", *Multiscale Modeling and Simulation*, vol. 7, No. 2., pp. 934-962.
Holden, L. et al. (1992), "A Tensor Estimator for the Homogenization of Absolute Permeability", *Transport in Porous Media* 8, pp. 37-46.
Isaaks, E. H., et al., (1989), "Applied Geostatistics", *Oxford University Press*, New York, pp. 40-65.
Journel, A., (1992), "Geostatistics: Roadblocks and Challenges," *Geostatistics, Troia '92: Quanititative Geoglogy and Geostatistics* 1, 213-224.
Klie, H., et al., (2005), "Krylov-Secant Methods for Accelerating the Solution of Fully Implicit Formulations", *SPE 92863, 2005 SPE Reservoir Simulation Symposium*, 9 pgs.
Mallat, S., (1999), "A Wavelet Tour of Signal Processing", *Academic Press*, San Diego, pp. 80-91.
Lu, B., et al., (2007), "Iteratively Coupled Reservoir Simulation for Multiphase Flow", *SPE 110114, 2007 SPE Annual Tech. Conf. and Exh.*, pp. 1-9.
Mosqueda, G., et al., (2007), "Combined Implicit or Explicit Integration Steps for Hybrid Simulation", *Earthquake Engng. & Struct. Dyn.*, vol. 36(15), pp. 2325-2343.
Strebelle, S., (2002), "Conditional simulations of complex geological structures using multiple-point statistics," *Mathematical Geology* 34(1), 1-21.
Sweldens, W., (1998), "The Lifting Scheme: A Construction of Second Generation Wavelets," *SIAM Journal on Mathematical Analysis* 29, 511-546.
Qi, D. et al. (2001), "An Improved Global Upscaling Approach for Reservoir Simulation", *Petroleum Science and Technology* 19(7&8), pp. 779-795.
Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M.
Whitcombe, D. N., et al., (2002), "Extended elastic impedance for fluid and lithology prediction," *Geophysics* 67, 63-67.
White, C.D. et al. (1987), "Computing Absolute Transmissibility in the Presence of Fine-Scale Heterogeneity", SPE 16011, $9^{th}$ SPE Symposium in Reservoir Simulation, pp. 209-220.
Wu, X.H. et al. (2007), "Reservoir Modeling with Global Scaleup", SPE 105237, $15^{th}$ SPE Middle East Oil & Gas Show & Conf., 13 pgs.
Yao, T., et al., (2004), "Spectral Component Geologic Modeling: A New Technology for Integrating Seismic Information at the Correct Scale," Geostatistics Banff, *Quantitative Geology & Geostatistics* 14, pp. 23-33.
Younis, R.M., et al., (2009), "Adaptively-Localized-Continuation-Newton: Reservoir Simulation Nonlinear Solvers That Converge All the Time", *SPE 119147, 2009 SPE Reservoir Simulation Symposium*, pp. 1-21.mos.
Zhang T., et al., (2006), "Filter-based classification of training image patterns for spatial Simulation," *Mathematical Geology* 38, 63-80.

\* cited by examiner

100

200

300

800

900

1000

1100

1200

1300

1400

1500

1500

1500

1900

2000

2100

2200

METHOD AND SYSTEM FOR FINITE VOLUME SIMULATION OF FLOW

CROSS-REFERENCE TO RELATED APPLICATION

This application is the National Stage of International Application No. PCT/US2011/21869, filed Jan. 20, 2011, which claims the benefit of U.S. Provisional Application No. 61/330,012, filed Apr. 30, 2010 entitled METHOD AND SYSTEM FOR FINITE VOLUME SIMULATION OF FLOW, the entirety of which is incorporated by reference herein.

FIELD

Exemplary embodiments of the present techniques relate to a method and system that provides finite volume simulations of flow in porous media.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Modern society is greatly dependant on the use of hydrocarbons for fuels and chemical feedstocks. Hydrocarbons are generally found in subsurface rock formations that are generally termed reservoirs. Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "simulation models" are used to simulate hydrocarbon reservoirs for locating hydrocarbons and optimizing the production of the hydrocarbons. A simulation model is a type of computational fluid dynamics simulation where a set of partial differential equations (PDE's) which govern multi-phase, multi-component fluid flow through porous media and the connected facility network can be approximated and solved. This is an iterative, time-stepping process where a particular hydrocarbon production strategy is optimized.

Properties for reservoir simulation models, such as permeability or porosity, are often highly heterogeneous and can vary. The variation is at all length scales from the smallest to the largest scales that can be comparable to the reservoir size. Computer simulations of such models that use a very fine grid discretization to capture the heterogeneity are computationally very expensive. However, disregarding the heterogeneity can lead to wrong results.

In order to achieve reasonable computational performance, the reservoir properties are often upscaled. For example, a homogenization technique may be employed to define the reservoir properties on coarser simulation grids. This technique in different variants has been widely used in the academia and the industry with reasonable success. Nevertheless, upscaling may have numerous drawbacks. As an example, upscaling may not work well for problems with non-separable scales, as discussed in greater detail below. Further, upscaling may not fully capture global features in a reservoir flow. Upscaling may also have difficulties estimating errors when complicated flows are modeled.

Heterogeneous or multiscale phenomena can be classified in two categories: separable scales and non-separable scales. It is common for a porous media to have multiple scales on which the properties of the media vary. The scales in reservoir may be not separable, for example, if the features vary continuously across the reservoir. Upscaling methods may resolve models with separable scales, but may not be able to correctly resolve non-separable models.

In addition to non-separable phenomena, there are features like channels, long fractures and faults that can extend through a large part of the reservoir. These may be referred to as global features and information. Current upscaling methods can miss the influence of the global features that could be significant to flow simulations, i.e., there may not be information that upscaling algorithms can use to generate more complicated models. Thus, the results may not be very realistic.

Another approach that may be used instead of, or in addition to, upscaling is multiscale simulation. In a multiscale simulation, the computations are still performed on a coarser grid, but fine grid information is used to construct a set of basis functions that may be used for mapping fine grid properties to the coarse grid. Multiscale simulations can be orders of magnitude faster than simulations on the fine grid, providing solutions that are of comparable quality. One multiscale method is the multiscale finite element method (MsFEM). See, e.g., T. Y. Hou and X. H. Wu, *A multiscale finite element method for elliptic problems in composite materials and porous media*, J. Comput. Phys., 134:169-189, 1997. This technique shares similarities to other numerical multiscale methods, such as variational multiscale finite element methods. See T. Arbogast and K. Boyd, *Subgrid upscaling and mixed multiscale finite elements*, SIAM Num. Anal., 44:1150-1171, 2006; see also T. J. R. Hughes, G. R. Feijoo, L. Mazzei, and J.-B. Quincy, *The variational multiscale method—A paradigm for computational mechanics*, Comput. Meth. Appl. Mech. Eng., 166:3-24, 1998. The techniques may also be similar to heterogeneous multiscale methods proposed by W. E and B. Engquist, *The heterogeneous multiscale methods*, Comm. Math. Sci., 1(1) (2003), pp. 87-133. Another approach that has been developed is a mixed multiscale finite element method MMsFEM, which is locally mass conservative and can be applied to multiphase simulations. See Z. Chen and T. Y. Hou, *A mixed multiscale finite element method for elliptic problems with oscillatory coefficients*, Math. Comp., 72:541-576, 2002. As these references show, intensive research into the use of multiscale methods has been performed for more than ten years, especially in academia. The simulation problems solved with multiscale methods have been simplified and are more academic than practical, though there is a trend to apply multiscale methods to more realistic and complex problems.

The multiscale methods discussed above use local information and perform well for separable scales. However, multiscale methods using only local information may suffer from resonance errors, which can be the dominant error in multiscale simulations. Resonance errors show up as an oscillation of a function across a simulation cell, increasing in magnitude near the edges of a cell in a simulation mesh. The resonance errors are usually proportional to the ratio between the characteristic length scale and the coarse mesh size. The ratios are small when the magnitudes of the characteristic length scales are distinctly different from the magnitude of the coarse mesh size. The ratios become large when the characteristic length scales are close to the coarse mesh size. Thus, the errors show up for the entire range of the characteristic length scales, and the errors are different for different characteristic length scales. See, e.g., Y. Efendiev, V. Gunting, T. Y. Hou, and R. Ewing, *Accurate multiscale finite element methods for two-phase flow simulations*, J. Comp. Phys., 220(1):155-174, 2006. Using some limited global information may be useful for the construction of basis functions in order to develop multiscale methods that reduce or remove resonance errors, see J. E. Aarnes, Y. Efendiev, and L. Jiang, *Mixed multiscale finite element methods using limited global information*, SIAM MMS, 7(2):655-676, 2008. Moreover, MsFEMs using global information may be applicable in problems without scale separation.

Industrial and academic researchers have reported results for a similar technique, the MultiScale Finite Volume method (MSFV). See e.g. P. Jenny, S. H. Lee, and H. A. Tchelepi, *Multi-scale finite-volume method for elliptic problems in subsurface flow simulation*, J. Comput. Phys., 187 (2003), pp. 47-67; see also P. Jenny, S. H. Lee, and H. A. Tchelepi, *Adaptive multiscale finite-volume method for multiphase flow and transport*, SIAM MMS, 3 (2004), pp. 50-64.

For example, U.S. Pat. No. 7,496,488 to Jenny, et al., discloses a multi-scale finite-volume method for use in subsurface flow simulation. In the method, a multi-scale finite-volume (MSFV) method is used to solve elliptic problems with a plurality of spatial scales arising from single or multi-phase flows in porous media. The method efficiently captures the effects of small scales on a coarse grid, is conservative, and treats tensor permeabilities correctly. The underlying idea is to construct transmissibilities that capture the local properties of a differential operator. This leads to a multi-point discretization scheme for a finite-volume solution algorithm. Transmissibilities for the MSFV method are preferably constructed only once as a preprocessing step and can be computed locally.

U.S. Patent Application Publication No. 2008/0208539 by Lee, et al., discloses a method, apparatus and system for reservoir simulation using a multi-scale finite volume method including black oil modeling. The multi-scale finite-volume (MSFV) method simulates nonlinear immiscible three-phase compressible flow in the presence of gravity and capillary forces. Consistent with the MSFV framework, flow and transport are treated separately and differently using a fully implicit sequential algorithm. The pressure field is solved using an operator splitting algorithm. The general solution of the pressure is decomposed into an elliptic part, a buoyancy/capillary force dominant part, and an inhomogeneous part with source/sink and accumulation. A MSFV method is used to compute the basis functions of the elliptic component, capturing long range interactions in the pressure field. Direct construction of the velocity field and solution of the transport problem on the primal coarse grid provides flexibility in accommodating physical mechanisms. The MSFV method computes an approximate pressure field, including a solution of a course-scale pressure equation; constructs fine-scale fluxes; and computes a phase-transport equation.

As described in the references above, the MSFV methods have been used in structured Cartesian grids and are closely related to the Multi-Point Flux Approximation schemes (MPFA) popular in the oil industry. MSFV relies on two sets of basis functions, both for the coarse-scale pressure.

However, there are several problems with the existing approaches for finite volume discretizations using the MSFV. For example, solving problems for the basis function can be computationally expensive. Further, the MSFV has not been extended to unstructured grids and global information is not used in the MSFV. Geometric information can be needed to impose boundary conditions, which is very difficult to implement for unstructured grids. In addition, the multiscale basis uses only local information and cannot resolve global features like channels, impermeable shale barriers, fractures, etc.

SUMMARY

An exemplary embodiment of the present techniques provides a method for modeling a hydrocarbon reservoir. The method includes deriving a computational mesh from a fine unstructured mesh using a multilevel mixed multiscale finite volume (MMMFV) method. Deriving the computational mesh includes computing a first algebraic multilevel basis function for a pressure, constructing an interaction region, generating a primary mesh, computing a second algebraic multiscale basis function for a velocity approximation, and simulating the hydrocarbon reservoir using the computational mesh. The method also includes generating a data representation of a physical hydrocarbon reservoir in a non-transitory, computer-readable, medium based at least in part on the results of the simulation.

The method may also include using global information in the construction of the second algebraic multiscale basis function by selecting an auxiliary mesh, approximating a solution on the auxiliary mesh, and calculating one or more velocity basis functions using the provided global information. Further, in the method the first algebraic multilevel basis function, the second algebraic multiscale basis function, or both, may be based, at least in part, on a discrete harmonic function.

In the method, deriving the computational mesh may include calculating a primary mesh and one or more interaction regions, and selecting an approximation spaces, wherein the approximation spaces comprise P and U. Deriving the computational mesh may also include selecting test spaces, where the test spaces comprise Q and V, and selecting discrete gradient and divergence operators.

In the method, computing the first algebraic multilevel basis function may include setting a plurality of boundary conditions to one at a center point of a coarse computational cell in the primary mesh, setting the plurality of boundary conditions to zero at a boundary of the coarse computational cell in the primary mesh, and solving a basis function using the plurality of boundary conditions.

In the method, computing the first algebraic multilevel basis function may include computing all coarse functions for a computational mesh simultaneously so as to minimize an energy of a computational mesh. Further, computing the first algebraic multilevel basis function may include selecting one or more coarse points, selecting one or more fine points that belong to each coarse point, computing a coarse basis, and evaluating an approximation quality of the coarse basis. The method may include iterating until the approximation quality is acceptable.

In the method, computing the coarse basis may include connecting two points, $a_i$ and b, in a computational mesh $\Sigma_h$ with a straight line [$a_i$, b], assigning a point in $\Sigma_h$ that is closest to the straight line [$a_i$, b] to be $a_{i+1}$, connecting generating a line from $a_i$ to $a_{i+1}$, and if $a_{i+1} \neq b$, setting i=i+1. Computing the coarse basis may include selecting another connection and repeating, for example, until all connections are finished.

In the method, computing the coarse basis may include selecting a center point of the interaction region, selecting a center point of one or more edges of the interaction region, connecting the center point of the interaction region to the center point of an edge, and connecting the one or more edges to form faces of polygons.

In the method, constructing the interaction region may include constructing a triangulation of coarse points by constructing each edge of the triangulation. Constructing each edge of the triangulation may include connecting two coarse points, $a_i$ and b in a computational mesh $\Sigma_h$ with a straight line [$a_i$, b], and assigning a point in $\Sigma_h$ to be $a_{i+1}$, wherein the point is closest to the straight line [$a_i$, b]. Further, constructing each edge of the triangulation may include connecting generating a line from $a_i$ to $a_{i+1}$; and if $a_{i+1} \neq b$, setting i=i+1, and repeating until $a_{i+1}$=b. Constructing each edge of the triangulation may also include selecting another connection and repeating. Finally, constructing each edge of the triangulation may include constructing one or more faces of the triangulation by selecting a center point of an interaction region, selecting a center point of one or more edges of the interaction region, connecting the center point of the interaction region to the center point of an edge, and connecting one or more faces of polygons.

The method may include managing a production of a hydrocarbon from the physical hydrocarbon reservoir based, at least in part, upon data representation. Managing the production may include converting injectors into producers, converting producers into injectors, changing production rates, drilling new wells to the reservoir, or any combinations thereof. In the method, a quality of the velocity approximation may be improved by calculating a special vector basis functions, and solve a small local system for a coarse cell.

Another exemplary embodiment of the present techniques provides a method for producing a hydrocarbon from a hydrocarbon reservoir. The method includes simulating the reservoir using a multilevel mixed multiscale finite volume method on an unstructured mesh. Simulating the reservoir may include computing a first algebraic multilevel basis function for a pressure, constructing an interaction region, generating a primary mesh, computing a second algebraic multiscale basis function for a velocity approximation, and producing a hydrocarbon from the hydrocarbon reservoir based, at least in part, upon the results of the simulation.

In the method, producing the hydrocarbon may include drilling one or more wells to the hydrocarbon reservoir, wherein the wells comprise production wells, injection wells, or both. Further, producing the hydrocarbon may include setting production rates from the hydrocarbon reservoir.

Another exemplary embodiment of the present techniques provides a Mixed Multiscale Finite Volume Method for simulating flow in a porous media. the Mixed Multiscale Finite Volume method includes collecting global information about a hydrocarbon reservoir, deriving an elliptic problem based on a saturation equation, calculating a plurality of unstructured coarse meshes and a plurality of pressure basis functions corresponding to the plurality of unstructured coarse meshes, solving the plurality of basis functions to reconstruct a velocity vector field for each of the plurality of unstructured coarse meshes, and iterating a simulation until a final timeframe is reached. The simulation may include solving a pressure equation for a plurality of computational cells in each of the plurality of unstructured coarse meshes, calculating a total velocity for each of the plurality of coarse meshes, solving the elliptical problem for each of the plurality of unstructured coarse meshes, computing a phase velocity for each of the plurality of unstructured coarse meshes, and computing a component transport for each of the plurality of unstructured coarse meshes.

The Mixed Multiscale Finite Volume method may include combining the phase velocity computed for each of the plurality of unstructured coarse meshes to obtain a phase velocity for the hydrocarbon reservoir. The Mixed Multiscale Finite Volume method may also include combining the component transport computed for each of the plurality of coarse meshes to obtain a phase velocity for the hydrocarbon reservoir.

Another exemplary embodiment of the present techniques provides a system for simulating a hydrocarbon reservoir. the system includes a processor, and a non-transitory storage device, wherein the storage device comprises a data representation of the hydrocarbon reservoir, wherein the data representation is a unstructured computational mesh determined by a Mixed Multiscale Finite Volume method. The system also includes a memory device, wherein the memory device comprises code to direct the processor to compute a first algebraic multilevel basis function for a pressure, construct an interaction region, generate a primary mesh, compute a second algebraic multiscale basis function for a velocity approximation, simulate the hydrocarbon reservoir using the primary mesh, and update the data representation based at least in part on the results of the simulation. In the system, the processor may include a multi-processor cluster.

DESCRIPTION OF THE DRAWINGS

The advantages of the present techniques are better understood by referring to the following detailed description and the attached drawings, in which.

DETAILED DESCRIPTION

Figure 1:
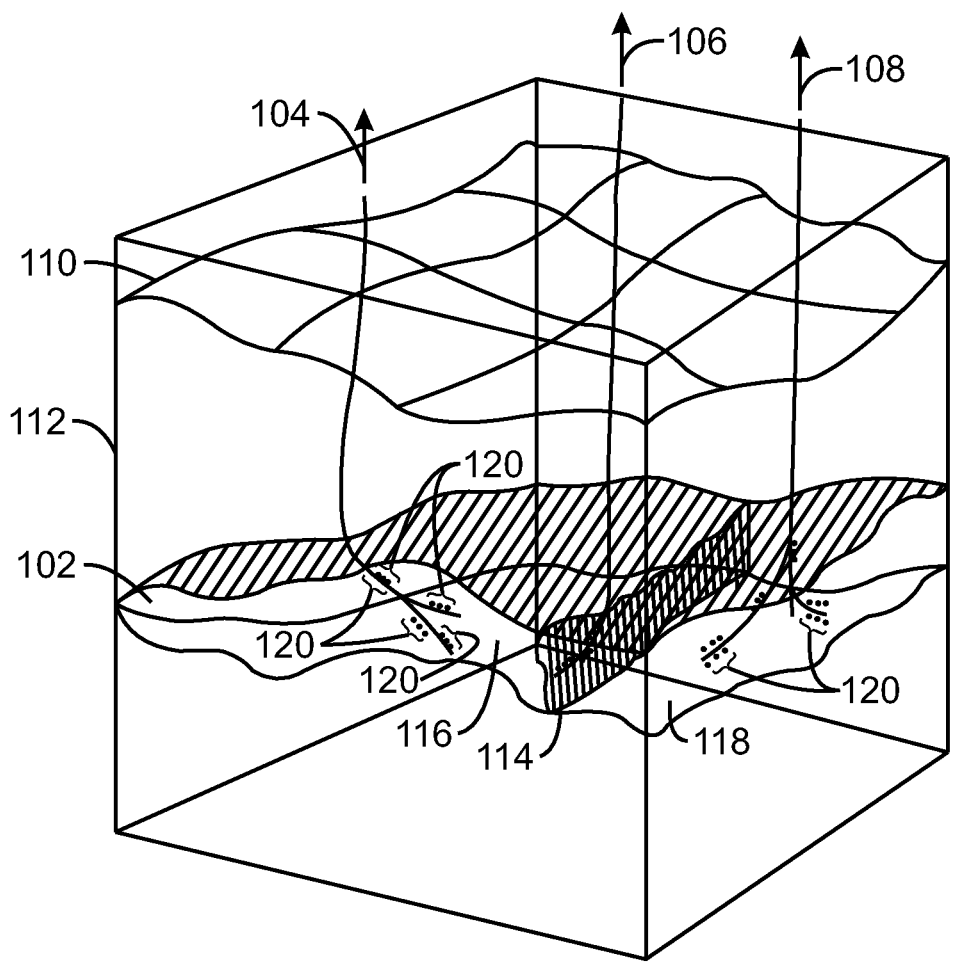
FIG. 1 is a schematic view of a reservoir, in accordance with an exemplary embodiment of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Coarsening" refers to reducing the number of cells in simulation models by making the cells larger, for example, representing a larger space in a reservoir. Coarsening is often used to lower the computational costs by decreasing the number of cells in a geologic model prior to generating or running simulation models.

"Computer-readable medium" or "non-transitory, computer-readable medium" as used herein refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions.

As used herein, "to display" or "displaying" includes a direct act that causes displaying of a graphical representation of a physical object, as well as any indirect act that facilitates displaying a graphical representation of a physical object. Indirect acts include providing a website through which a user is enabled to affect a display, hyperlinking to such a website, or cooperating or partnering with an entity who performs such direct or indirect acts. Thus, a first party may operate alone or in cooperation with a third party vendor to enable the information to be generated on a display device. The display device may include any device suitable for displaying the reference image, such as without limitation a virtual reality display, a 3-d display, a CRT monitor, a LCD monitor, a plasma device, a flat panel device, or printer. The display device may include a device which has been calibrated through the use of any conventional software intended to be used in evaluating, correcting, and/or improving display results (for example, a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (for example, electronically or physically via a data storage device or hard copy) and/or otherwise made available (for example, via a network) in order to facilitate the subject using a printer to print a hard copy form of reference image. In such an example, the printer may be a printer which has been calibrated through the use of any conventional software intended to be used in evaluating, correcting, and/or improving printing results (for example, a color printer that has been adjusted using color correction software).

"Exemplary" is used exclusively herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water and gas) or energy through a physical system using a simulation model. The physical system may include a three dimensional reservoir model, fluid properties, and the number and locations of wells. Flow simulations may use or provide a strategy (often called a well-management strategy) for controlling injection and production rates. These strategies can be used to maintain reservoir pressure by replacing produced fluids with injected fluids (for example, water and/or gas). When a flow simulation correctly recreates a past reservoir performance, it is said to be "history matched," and a higher degree of confidence is placed in its ability to predict the future fluid behavior in the reservoir.

"Permeability" is the capacity of a rock to transmit fluids through the interconnected pore spaces of the rock. Permeability may be measured using Darcy's Law: $Q=(k\Delta P\, A)/(\mu L)$, wherein Q=flow rate (cm$^3$/s), $\Delta P$=pressure drop (atm) across a cylinder having a length L (cm) and a cross-sectional area A (cm$^2$), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy).

"Porosity" is defined as the ratio of the volume of pore space to the total bulk volume of the material expressed in percent. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

A "Reservoir" or "reservoir formation" is defined as pay zones (for example, hydrocarbon producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Simulation model" refers to a specific mathematical representation of a real hydrocarbon reservoir, which may be considered to be a particular type of geologic model. Simulation models are used to conduct numerical experiments (reservoir simulations) regarding future performance of the field with the goal of determining the most profitable operating strategy, for example, flow simulations. An engineer managing a hydrocarbon reservoir may create many different simulation models, possibly with varying degrees of complexity, in order to quantify the past performance of the reservoir and predict its future performance.

"Transmissibility" refers to the volumetric flow rate between two points at unit viscosity for a given pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for understanding connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, a casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

Overview

A Finite Volume (FV) method is a robust discretization method used in reservoir simulators. The FV method can provide reasonable accuracy for an acceptable computational cost and may be extended to unstructured grids. In an exemplary embodiment of the present techniques, a multiscale generalization of the FV method is applied to unstructured grids. This method is computationally efficient, due to the construction of discretizations using multiscale algorithms.

The method uses a multilevel approach to build coarse grid basis functions. Discrete harmonic functions can be used for the coarse grid basis, which may reduce or eliminate the influence of the boundary conditions and make the techniques applicable to unstructured grids. The support can then be built on each level in such a way that provides the best approximation, for example, energy minimizing, among others. The techniques use unstructured grids, both fine and coarse, and incorporate global information in the process.

FIG. 1 is a schematic view 100 of a reservoir 102, in accordance with an exemplary embodiment of the present techniques. The reservoir 102, such as an oil or natural gas reservoir, can be a subsurface formation that may be accessed by drilling wells 104, 106, and 108 from the surface 110 through layers of overburden 112. The wells 104, 106, and 108 may be deviated, such as being directionally drilled to follow the reservoir 102. Further, the wells can be branched to increase the amount of hydrocarbon that may be drained from the reservoir, as shown for wells 104 and 108. The wells 104, 106, and 108, can have numerous areas with perforations 120 (indicated as dots next to the wells) to allow hydrocarbons to flow from the reservoir 102 into the wells 104, 106, and 108 for removal to the surface. The reservoir 102 may have one or more faults 114 dividing areas, for example regions 116 and 118, which may either restrict or enhance the flow of hydrocarbons.

A simulation model, or simulator, of the reservoir 102 is likely to find that the greatest changes occur in the vicinity of the wells 104, 106, and 108, and other reservoir features, such as the fault 114. Accordingly, it would be useful to keep fine structure in the vicinity of each of these features.

Figure 2:
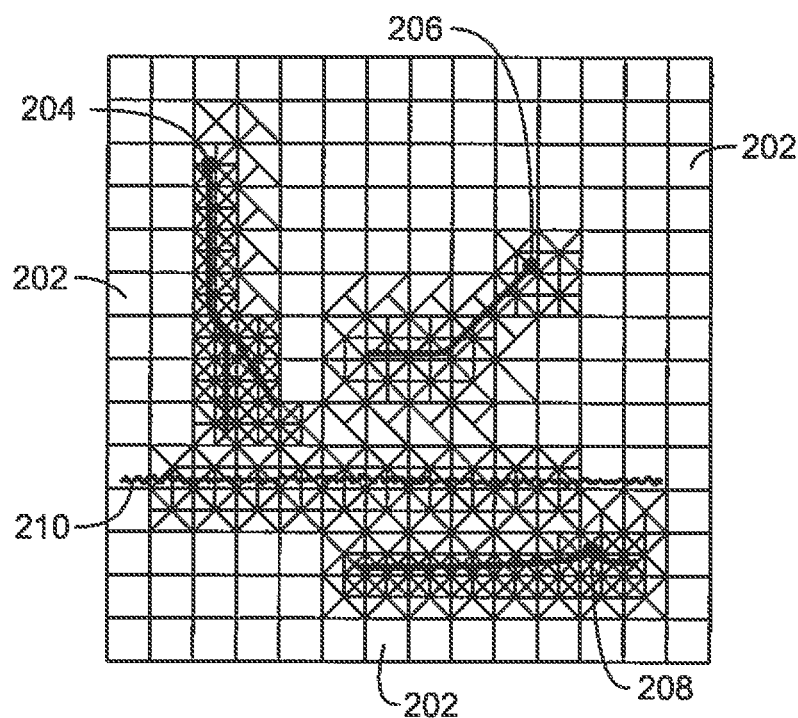
FIG. 2 is a top view of a reservoir showing a planar projection of a computational mesh over the reservoir, in accordance with an exemplary embodiment of the present techniques.

FIG. 2 is a top view of a reservoir showing a planar projection of a computational mesh 200 over the reservoir, in accordance with an exemplary embodiment of the present techniques. Although the computational mesh 200 is shown as a two dimensional grid of computational cells (or blocks) 202 to simplify the explanation of the problem, it should be understood that the actual computational mesh 200 can be a three dimension structure of computational cells 202 that encompasses the reservoir. Further, the computational cells 202 may be of any size or shape, resulting in an unstructured grid. Generally, a computational cell 202 is a single two or three dimensional location within a simulation model that represents a physical location in a reservoir. The computational cell 202 may have associated properties, such as a porosity, which is assumed to be a single value over the entire computational cell 202 and is assigned to the center of the computational cell 202. Computational cells 202 may interact with adjacent computational cells 202, for example, by having flux properties assigned to a shared border with the adjacent computational cells 202. The flux properties may include heat or mass transfer driven by a difference in temperature or pressure between the adjacent computational cells 202.

The computational mesh 200 can be coarsened in areas that may have less significant changes, for example, by combining computational cells 202 that are not in proximity to a well or other reservoir feature. Similarly, as shown in FIG. 2, the computational mesh 200 may retain a fine mesh structure in the vicinity of wells or other reservoir features, such as the first well 204, or other reservoir features, for example, a second well 206, a third well 208, a fault 210, or any other features that may show larger changes than other areas. The computational mesh 200 may be used to model a reservoir as discussed further with respect to FIG. 3.

Workflow for Modelling a Reservoir

Figure 3:
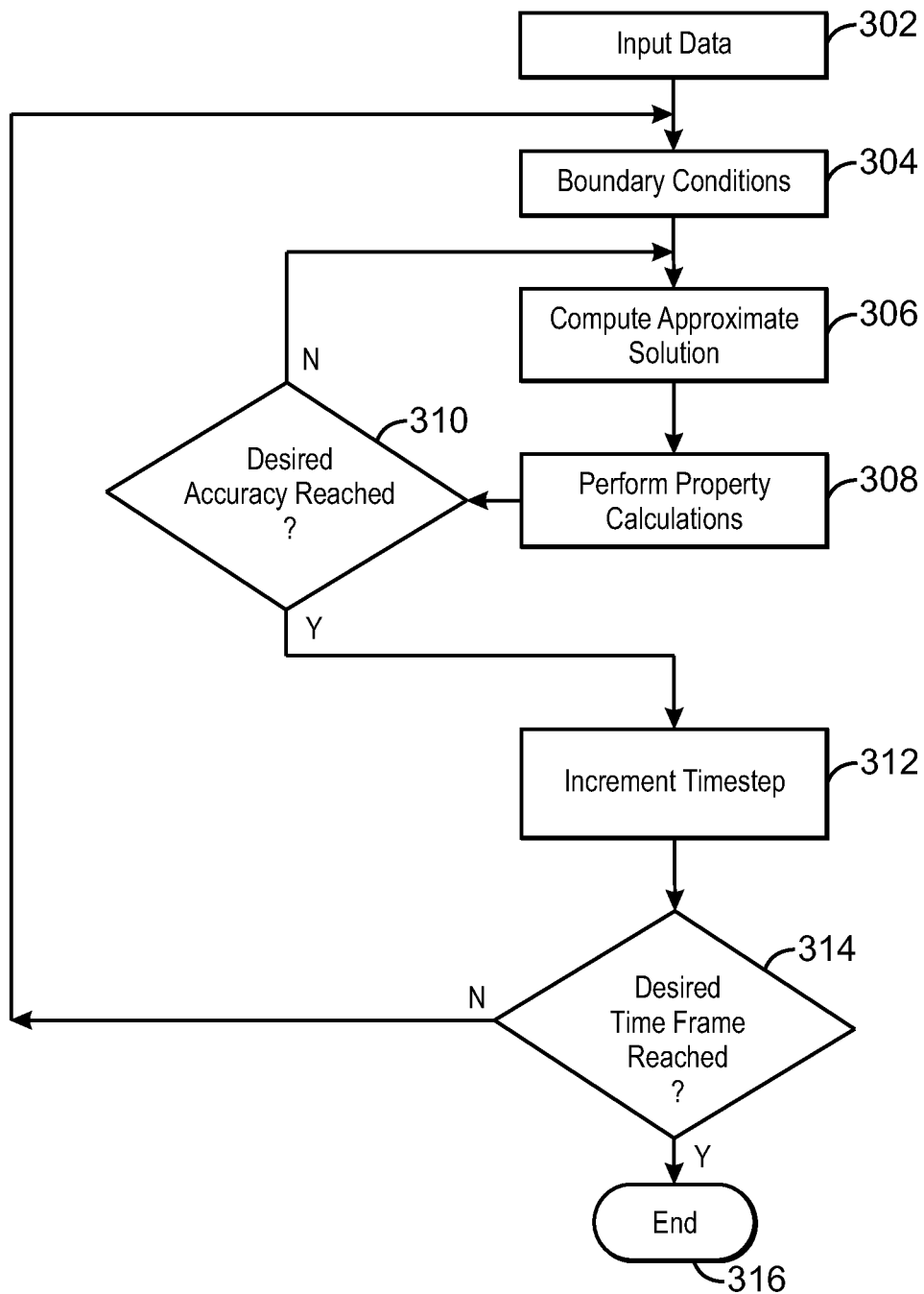
FIG. 3 is a process flow diagram of a workflow for modeling a reservoir, in accordance with an exemplary embodiment of the present techniques.

FIG. 3 is a process flow diagram of a workflow 300 for modelling a reservoir, in accordance with an exemplary embodiment of the present techniques. Although the discretization (coarsening) and the level of implicitness (which state variables, such as pressure or saturation, are treated implicitly or explicitly in the formulation) of the solution process varies, simulation models may perform in a similar fashion as workflow 300. A simulation model can begin at block 302 by parsing user input data. The input data may include the problem formulation, a geologic model that is discretized into grid blocks with physical properties defined at each grid block, including rock properties (such as permeability) and fluid properties (such as transmissibility). At block 304, boundary conditions for the simulation may be calculated, for example, from the governing equations.

At block 306, a linear solver may use a Jacobian matrix to generate an approximate solution for the simulation. At block 308, physical properties are calculated from the approximate solution. At block 310, the calculated properties are compared to either previously calculated properties or to measured properties to determination whether a desired accuracy has been reached, for example, by checking for convergence. In an exemplary embodiment, the determination is made by determining that the calculated properties have not significantly changed since the last iteration (which may indicate convergence). For example, convergence may be indicated if the currently calculated solution is within 0.01%, 0.1%, 1%, 10%, or more of the previously calculated solution. If the desired accuracy is not reached, process flow returns to block 306 to perform another iteration of the linear solver.

If at block 310, the desired accuracy has been reached, process flow proceeds to block 312, at which results are generated and the time is incremented by a desired time step. The results may be stored in a data structure on a tangible, machine readable medium, such as a database, for later presentation, or the results may be immediately displayed or printed after generation. The time step may be, for example, a day, a week, a month, a year, 5 years, 10 years or more, depending, at least in part, on the desired length of time for the simulation. At block 314, the new time is compared to the length desired for the simulation. If the simulation has reached the desired length of time, the simulation ends at block 316. If the time has not reached the desired length, flow returns to block 304 to continue with the next increment. The simulation time frame may be a month, a year, five years, a decade, two decades, five decades, or a century or more, depending on the desired use of the simulation results.

Computing an Approximate Solution

Computing the approximate solution at block 306 may involve solving a physical model at a series of steps. For example, a sequential implicit formulation of the flow of $N_C$ components in $N_P$ phases follows the pressure equation shown in Eqn. 1.

$$\phi \left[ \frac{1}{\phi} \cdot \frac{d\phi}{dp} - \frac{1}{v_T} \left( \frac{\partial v_T}{\partial p} \right) \right] \frac{\partial p}{\partial t} = \sum_{i=1}^{N_c} V_{Ti} \Theta_i, \quad \text{Eqn. 1}$$

In Eqn. 1, $\phi$ represents porosity and $V_{Ti}$ represents the partial molar volume of component i. Further, $\Theta_i = R_i - \nabla \cdot U_i$, where $U_i$ represents the molar flow rate for component i and $R_i$ represents the sources and sinks for component i. The molar flow rate of component i is defined in Eqn. 2.

$$U_i = \sum_{j=1}^{N_P} x_{ij} \xi_j v_j, \quad \text{Eqn. 2}$$

In Eqn. 2, $x_{ij}$ is the mole fraction of component i in phase j, $\xi_j$ is the molar density of phase j and $v_j$ represents the phase velocity. The generalized Darcy law gives the relation between the phase velocity and the phase pressure, as shown in Eqn. 3.

$$v_j = -\frac{K k_{rj}}{\mu_j} (\nabla P_j - \rho_j g \nabla D), \quad \text{Eqn. 3}$$

In Eqn. 3, K represents the absolute permeability, $k_{rj}$ represents the relative permeability of phase j, $\mu_j$ represents the viscosity of phase j, $\rho_j$ represents the mass density of phase j, g represents the gravitational acceleration constant and D represents the depth. The phase pressure is related to the base liquid pressure through the capillary pressures $P_{c,j}$, j=v,a, for the liquid phase (l) with the vapor phase (v) and the aqueous phase (a): $P_j = P + P_{c,j}$, j=v, a, $P = P_l$. The saturation is defined as the ratio $$S_j = \frac{V_j}{V_T},$$

where $V_j$ is the volume of phase j and $V_P$ is the pore volume.

The saturation equations are shown in Eqn. 4.

$$\frac{\partial}{\partial t}(\phi S_j) + \phi S_j c_j \frac{\partial p}{\partial t} = \sum_{i=1}^{N_c} V_{ji}\Theta_i, \quad j = 1, 2, \ldots, N_P. \quad \text{Eqn. 4}$$

In Eqn. 4, $V_{ji}$ represents the partial molar volume of phase j with respect to component i and $c_j$ represents the compressibility of phase j. These equations may be used to solve the approximation using the method shown in FIG. 4.

Figure 4:
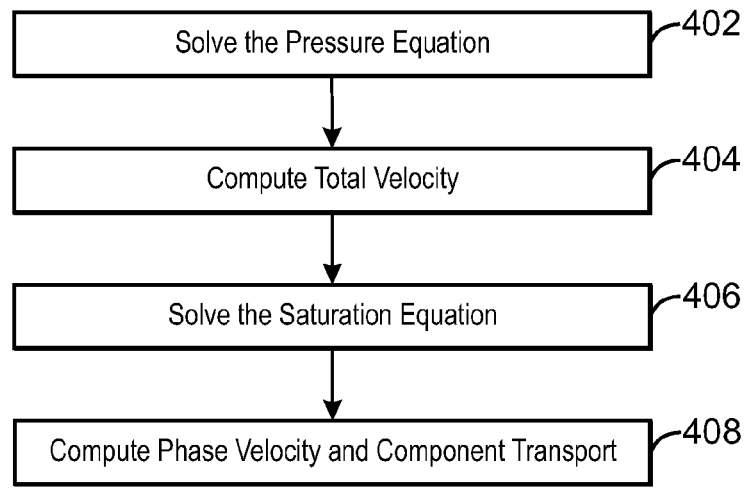
FIG. 4 is a process flow diagram of a method for computing an approximate solution for a sequential formulation for one Newton step, in accordance with an exemplary embodiment of the current invention.

FIG. 4 is a process flow diagram of a method 400 for computing an approximate solution for a sequential formulation for one Newton step (i.e., block 306 of FIG. 3), in accordance with an exemplary embodiment of the current invention. The method 400 starts at block 402 with the solution of the pressure equation (Eqn. 1). At block 404 the total velocities of fluid flow at these pressures are calculated, using Eqns. 2 and 3. The saturation equations (Eqn. 4) are solved at block 406, either explicitly or implicitly. At block 408, the phase velocities, component transport and the amount of each component in each computational cell 202 (FIG. 2) is computed. The method 400 is applicable for both compositional and black oil models.

Mixed Finite Volume methods

A finite volume discretization may be determined for a linear elliptic equation, i.e., after an implicit discretization in time like Backward Euler is performed. Consider the system shown in Eqn. 5.

$$-\text{div}(K\nabla p(x)) = f(x) \text{ in } \Omega,$$

$$p(x) = 0 \text{ on } \partial\Omega. \quad \text{Eqn. 5}$$

If $u = -K\nabla p$, Eqn. 5 can be rewritten as the system shown in Eqn. 6.

$$K^{-1}u + \nabla p = 0$$

$$\text{div}(u) = f(x) \quad \text{Eqn. 6}$$

The first equation in Eqn. 6 can be multiplied by a vector function v and the second equation in Eqn. 6 can be multiplied with a scalar function q. Integration of the equations results in the problem: find u, u∈U and p, p∈P such that Eqn. 7 is satisfied.

$$\int_\Omega K^{-1}u \cdot v + \int_\Omega \nabla p \cdot v = 0 \quad \forall v \in V, \quad \text{Eqn. 7}$$

$$\int_\Omega \text{div}(u)q = \int_\Omega f(x)q \quad \forall q \in Q.$$

If the spaces U, V and P, Q are properly chosen, the problem presented in Eqn. 7 is equivalent to the problem presented in Eqn. 5. For example, one of ordinary skill in art would recognize that U is the space of functions for which the divergence is a square integrable function. Further, that V is the space of square integrable vector functions; P is the space of functions with square integrable first derivatives; and Q is the space of square integrable functions. Approximate solutions to this problem, $u_h$ and $p_h$, can be found by solving an approximate discrete problem. The first step is to replace the infinite dimensional spaces U, V and P, Q with finite dimensional subspaces $U_h$, $V_h$ and $P_h$, $Q_h$. Next, the continuous operators ∇ (gradient) and div (divergence) are approximated with discrete operators $\nabla_h$ and $\text{div}_h$. Thus, the discrete problem is to find $u_h \in U_h$ and $p_h \in P_h$ such that Eqn. 8 is satisfied.

$$\int_\Omega K^{-1}u_h \cdot v_h + \int_\Omega \nabla_h p_h \cdot v_h = 0 \quad \forall v_h \in U_h, \quad \text{Eqn. 8}$$

$$\int_\Omega \text{div}_h(u_h)q_h = \int_\Omega f(x)q_h \quad \forall q_h \in Q_h.$$

Examples of Mixed Finite Volume Grids

Several examples of computational meshes are presented below. In all of these examples, there are primary computational cells and dual computational cells (which may be termed "interaction regions"). A particular Mixed Finite Volume method, as described by Eqn. 8, is fully defined if the primary and the dual meshes are described, the approximation (test and trial) spaces are defined, and the discrete operators are specified.

Figure 5:
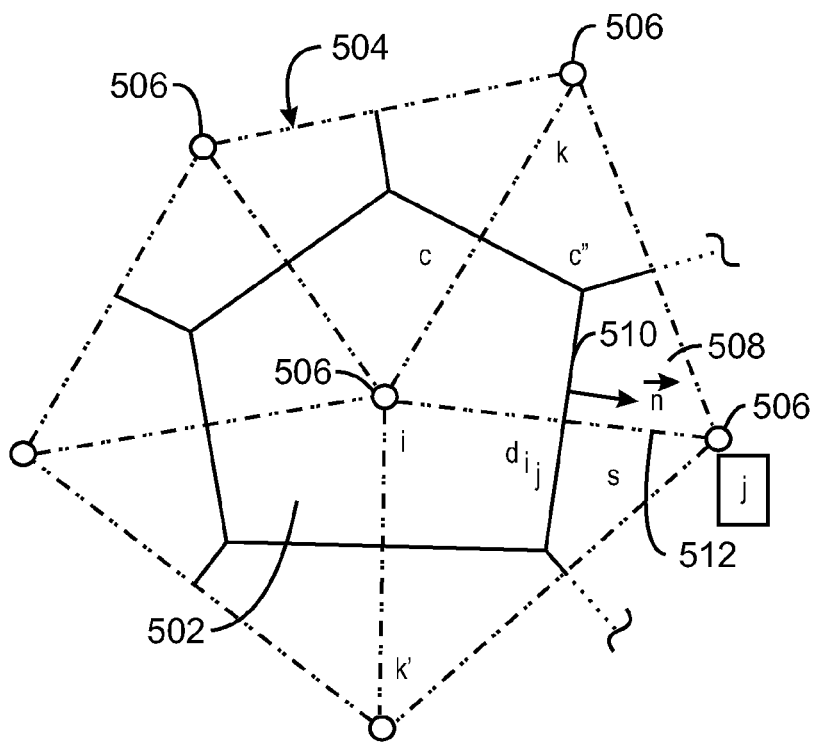
FIG. 5 is an illustration of a first type of mesh that may be used in exemplary embodiments, termed a Voronoi mesh.

FIG. 5 is an illustration of a first type of mesh that may be used in exemplary embodiments, termed a Voronoi mesh 500. In the Voronoi mesh 500, the primary computational cells are the Voronoi volumes 502 and the interaction regions are the triangles 504. The triangles 504 are formed by connecting the center point 506 of each Voronoi volume 502 to the center of an adjoining Voronoi volume 508 with which it shares a face 510. The line 512 between the center points 506 is considered to be perpendicular to the face 510 and therefore parallel to the normal vector n. $d_{ij}$ is the length of the interval connecting the nodes I and j. Property parameters, such as c, p, and s are considered to exist at the center point 506.

$P_h$ is the space of linear piecewise continuous functions on the Delaunay triangles dual to the Voronoi volumes. These are the triangles 504. $Q_h$ is the space of piecewise constants on the Voronoi volumes 502. Further, $U_h = V_h$ is the space of piecewise vector constants on triangles with continuous normal components. Operators that may be used with the Voronoi mesh 500 include $\nabla_h = \nabla$, and $$\int_\Omega \text{div}_h(u_h)q_h \approx \sum_{K \in \Omega} \int_{\partial K} u_h \cdot n q_h.$$

In some embodiments, the Voronoi mesh 500 can be replaced by the Donald mesh. In the Donald mesh, the control volumes 502 can be formed by connecting the center of gravity of the triangles 502 to the centers of the edges of the triangles 502.

Figure 6:
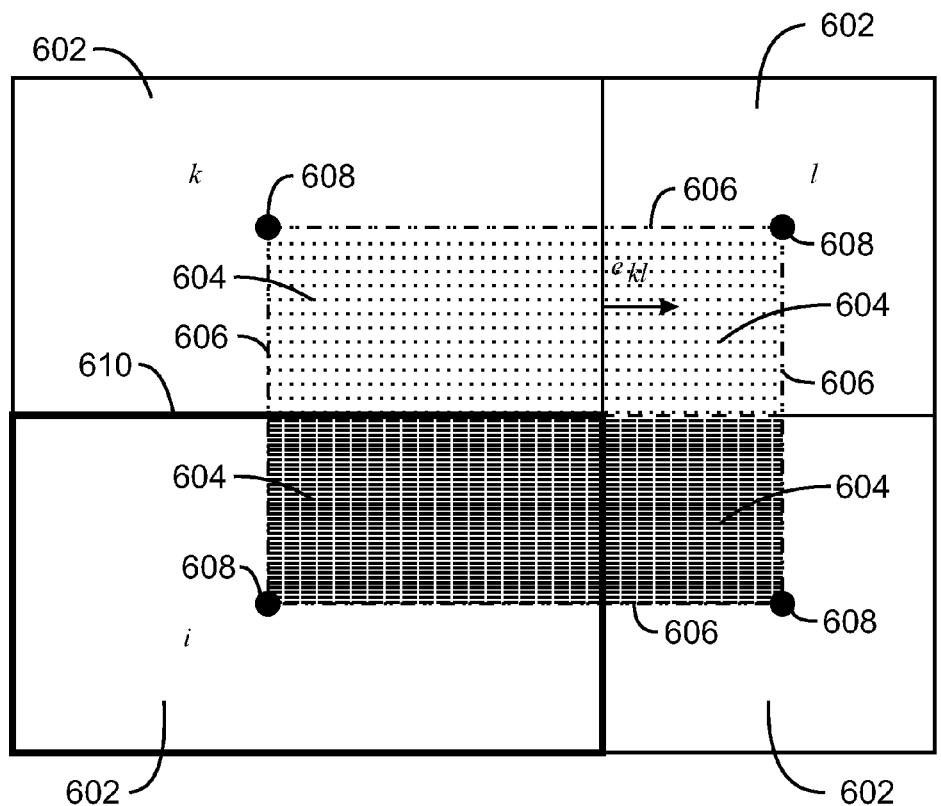
FIG. 6 is an illustration of a second type of mesh that may be used in exemplary embodiments, termed a rectangular mesh.

FIG. 6 is an illustration of a second type of mesh that may be used in exemplary embodiments, termed a rectangular mesh 600. The rectangular mesh 600 has primary computational cells 602 and interaction regions 604. The interaction regions 604 are created by lines 606 connecting the center points 608 of the computational cells 602. $P_h = Q_h$ is the space of piecewise constant functions on the cell-centered mesh, i.e., the cells 602. Further, $U_h = V_h$ is the space of piecewise vector constants on the dual rectangles with continuous normal components.

Operators that can be used with the rectangular mesh 600 include $$\int_\Omega \nabla p_h \cdot v_h \approx \sum_{E-edge} \int_E v_h \cdot [p_h],$$

in which [ ] denotes the difference (or jump) between the values on the different sides of an edge 610 between computational cells 602, e.g., $$\int_\Omega div_h(u_h)q_h \approx \sum_{K\in\Omega} \int_{\partial K} u_h \cdot nq_h.$$

Another possible MFV method can be constructed assuming that $P_h$ is the space of piecewise bilinear functions. In this instance, $\nabla_h = \nabla$. There is one bilinear basis function for each cell center 608. The basis function is one at this particular point and zero outside of the cell.

Figure 7:
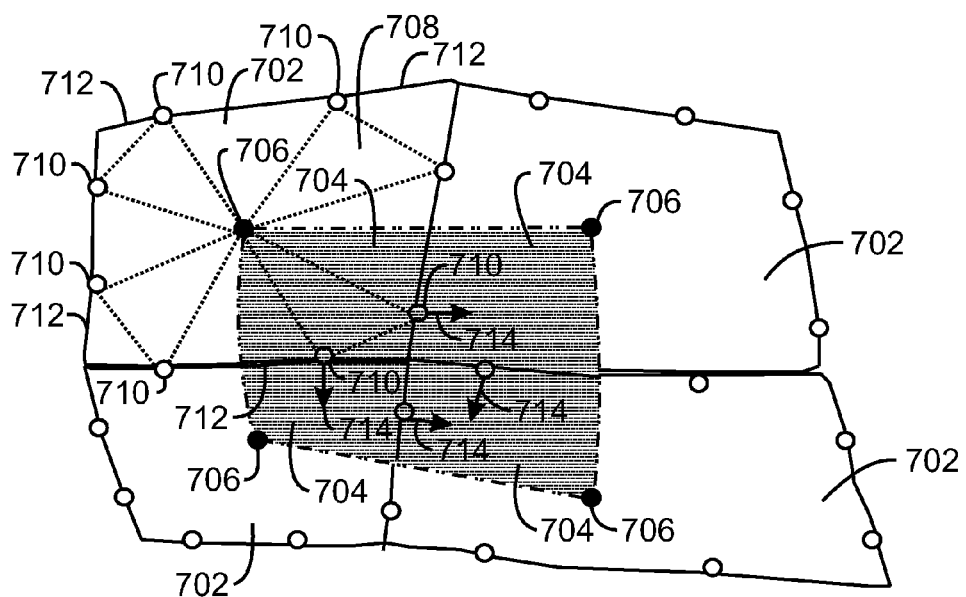
FIG. 7 is an illustration of a third type of mesh that may be used in exemplary embodiments, termed a quadrilateral mesh.

FIG. 7 is an illustration of a third type of mesh that may be used in exemplary embodiments, termed a quadrilateral mesh 700. In the quadrilateral mesh 700, the primary computational cells are the quadrilaterals 702 and the interaction region includes the four polygons 704 formed by connecting the center points 706 of the quadrilaterals 702. $P_h$ is the space of piecewise linear functions on triangles 708 created within each quadrilateral 702. One vertex of each triangle 708 is in the cell-center point 706, while the other two vertices 710 are on the edges 712 of the quadrilaterals 702. Further, $Q_h$ is the space of piecewise constants on the quadrilaterals 702, $U_h$ is the space of piecewise vector constants on the polygons 704 with continuous normal components and $V_h$ is the space of the piecewise constant vectors on the polygons 704. Thus, $U_h$ and $V_h$ can be represented by the vectors 714 drawn from the vertices 710 of the triangles 708.

Operators that may be used with the quadrilateral mesh 700 include $$\int_\Omega \nabla p_h \cdot v_h \approx \sum_{K\in\Omega} \sum_{j=1}^{4} \int_{K_j} \nabla p_h \cdot v_h \text{ and}$$

$$\int_\Omega div_h(u_h)q_h \approx \sum_{K\in\Omega} \int_{\partial K} u_h \cdot nq_h.$$

Another version has $P_h$, the space of piecewise bilinear functions, on the quadrilateral sub-mesh formed by the intersection of a quadrilaterals 702 and a polygon 704 (e.g., one quarter of the interaction region). An additional equation may then be added for the center of the polygon 704. In this instance $\nabla_h = \nabla$.

All of the examples above can be extended to three dimensional meshes. Particular examples are the three dimensional Voronoi grids, the so called 2.5-D PEBI (PErpendicular BIsector) grids that are Voronoi in the xy plane and prisms in z direction, and grids that consist of uniform or distorted parallelepipeds.

Multilevel Basis Functions

In exemplary embodiments, the space $P_h$ is built using multilevel techniques. Accordingly, the discussion below is applicable to both finite volume and finite element discretizations. In a multilevel construction of a multiscale basis, as discussed herein, the computational expenses for a simulation are proportional to the number of unknowns on a fine mesh. In contrast, a standard multiscale basis not constructed using multilevel techniques can have computational expenses that are proportional to at least the square of the number of unknowns on the fine mesh. To simplify the explanation of this concept, it may be assumed in the explanation of the following figures that there is a fine unstructured mesh and a basis for $P_h$ is defined on this mesh.

Figure 8:
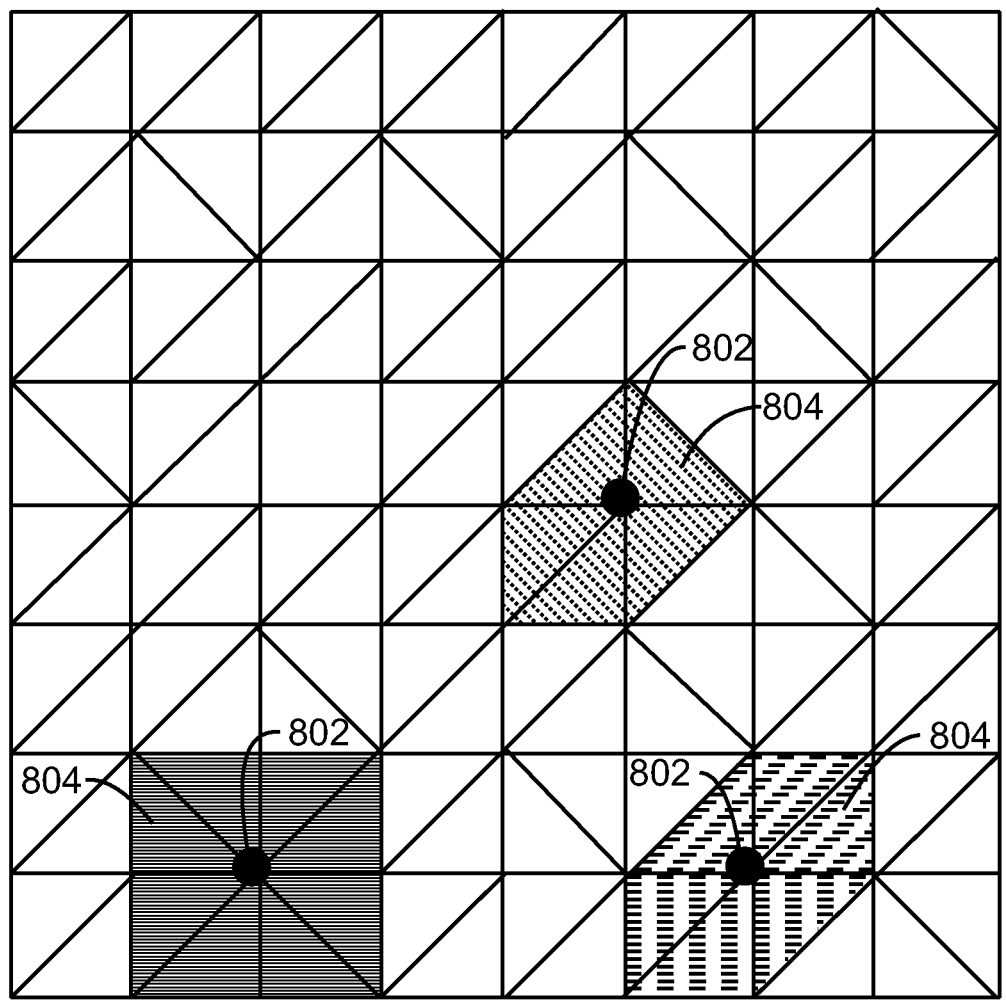
FIG. 8 shows an unstructured two dimensional triangular mesh, in accordance with exemplary embodiments of the present techniques.

FIG. 8 shows an unstructured two dimensional triangular mesh 800, in accordance with exemplary embodiments of the present techniques. A basis function can be defined at each vertex 802 for the finite element discretization. The value of the basis function is one at the vertex 802 and zero outside of its supporting region 804. The supporting regions 804 for three basis functions are shown in FIG. 8. The functions are piecewise linear, i.e., linear on each triangle. Basis functions for finite volume methods are constant on each cell.

Figure 9:
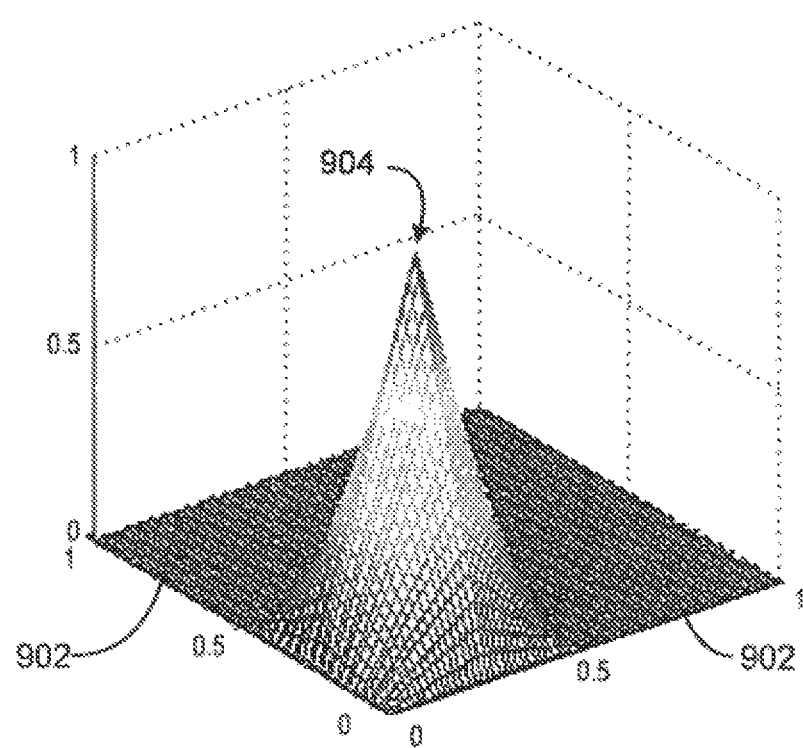
FIG. 9 is a graph showing a bilinear basis function, in accordance with an exemplary embodiment of the present techniques.

FIG. 9 is a graph 900 showing a bilinear basis function, in accordance with an exemplary embodiment of the present techniques. For a rectangular mesh 600 (FIG. 6) the functions are bilinear. In this graph 900, the axes 902 represent a physical location in the mesh. The peak 904 of the basis function is at the center of the computational cell.

Building a Next Level Coarser Basis in a Multilevel Procedure

Figure 10:
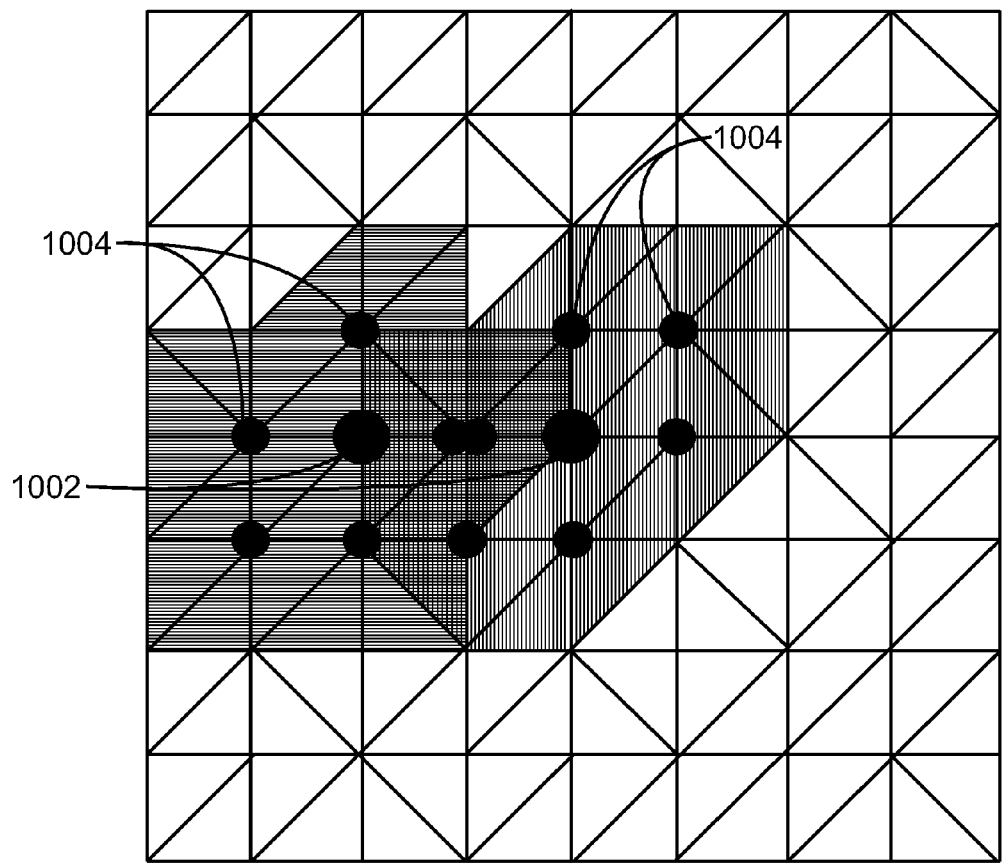
FIG. 10 shows an unstructured two dimensional triangular mesh that may be used to illustrate the procedure for building a next level coarser basis function, in accordance with an exemplary embodiment of the present techniques.

FIG. 10 shows an unstructured two dimensional triangular mesh 1000 that may be used to illustrate the procedure for building a next level coarser basis function, in accordance with an exemplary embodiment of the present techniques. One or more coarse points 1002 can be selected on the mesh. Coarse points are the vertices for finite elements or cell-centers for finite volumes that will be the "centers" for the coarser basis functions, i.e., the points where the basis functions will be one. As one of ordinary skill in the art will recognize, there are numerous algorithms that may be used for the selection of the coarse points and the coarse meshes. In general the coarse mesh and the discretization defined on it have to be able to resolve the flow in a reservoir. Thus, the coarse points may be selected to represent points that can have the highest level of change in the reservoir, such as wells, and the like.

Once the coarse points are selected, the fine points 1004 associated to each coarse point 1002 may be identified on the mesh 1000. It can be noted that some functions on the fine mesh can belong to the supports of several coarse mesh points. Once the fine points have been identified, a basis function may be calculated at each level. The procedure can be repeated recursively until the coarsest basis has small enough dimension.

The goal of the coarsening is to reduce the size of the coarse mesh considerably so the computational expenses also will be reduced. On the other hand the resulting coarse basis has to be fine enough to accurately approximate the solution of the problems. In order to balance these two contradictory goals some further criteria may be used. Since the basis functions are computed only once or very infrequently, the quality of the basis may be checked. This can be done in different ways, for example, by comparing the fine solution of the model elliptic problem to the coarse one. Such procedures allow for adaptively coarsening the mesh while providing good approximation properties and reducing the size of the final coarse mesh compared with the size of the original fine mesh. The quality of the basis may depend on the way the coarse mesh points are selected and how the basis functions are constructed.

Figure 11:
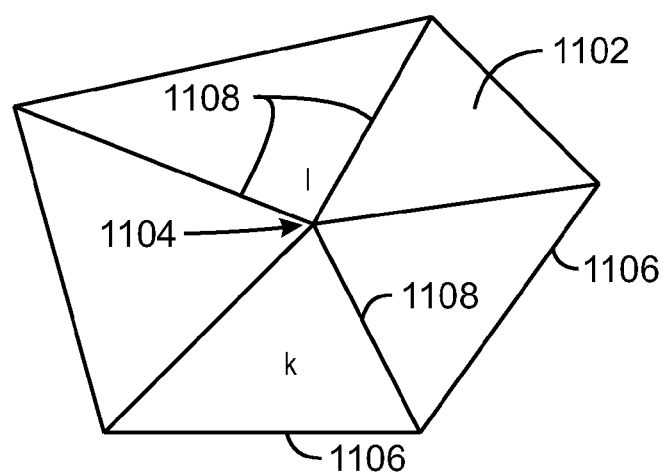
FIG. 11 is an illustration of a computational cell illustrating a technique for computing a basis function, in accordance with an exemplary embodiment of the present techniques.

FIG. 11 is an illustration of a computational cell 1100 illustrating a technique for computing a basis function, in accordance with an exemplary embodiment of the present techniques. There are several different ways to compute the basis functions. The support of the coarse basis function includes a number of triangles 1102, wherein the center point 1104 makes up one of the vertices of each triangle 1102. Eqn. 5 can be solved on each triangle 1102, but with different boundary conditions specified. The value for the basis function may be set to one at the center point 1104 and zero on each boundary 1106. A one dimensional problem may then be solved along each edge 1108. The solutions of the one dimensional problem may then be used as a boundary condition for the two dimensional basis function. The procedure for the three dimensional basis function is first to solve the one dimensional problem for the edges and then use the solutions as boundary conditions for the two dimensional problems of the faces. The solutions of the two dimensional problems provide the boundary conditions for the basis function.

Figure 12:
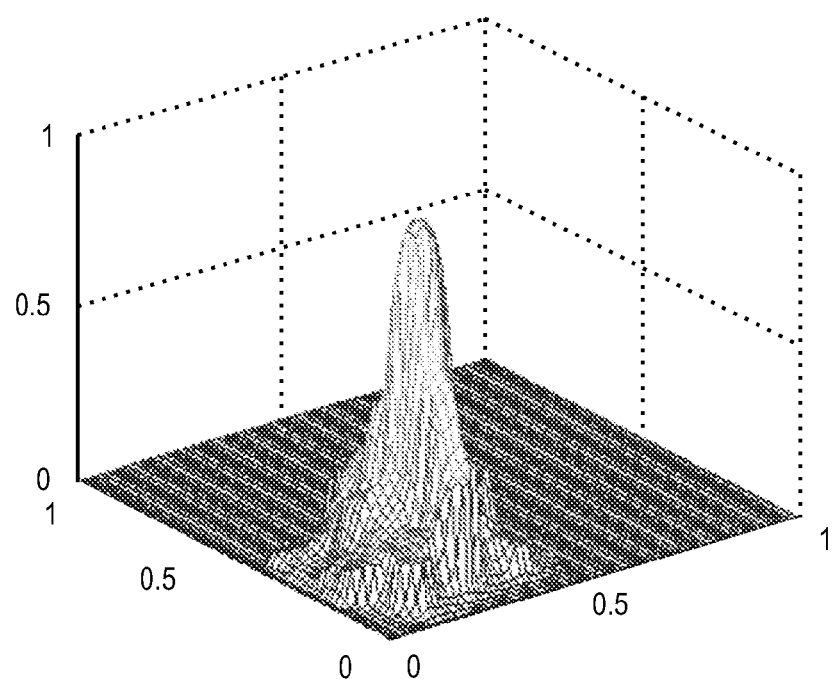
FIG. 12 is an example of the multiscale basis function resulting from the procedure discussed above, in accordance with an exemplary embodiment of the present techniques.

FIG. 12 is an example of the multiscale basis function 1200 resulting from the procedure discussed above, in accordance with an exemplary embodiment of the present techniques. However, the computational procedure outlined above uses geometric information for the mesh and, as a result, may be cumbersome and computationally intensive.

In exemplary embodiments, an alternative approach may be considered. The basis functions calculated using this approach may be termed algebraic multiscale. As for the previous procedure, the boundary conditions may be set to one in the center point 1104 of the support and zero on the boundary 1106. Eqn. 5 can then be solved with the boundary conditions specified above, eliminating the solution of the individual one dimensional problems along each edge.

Figure 13:
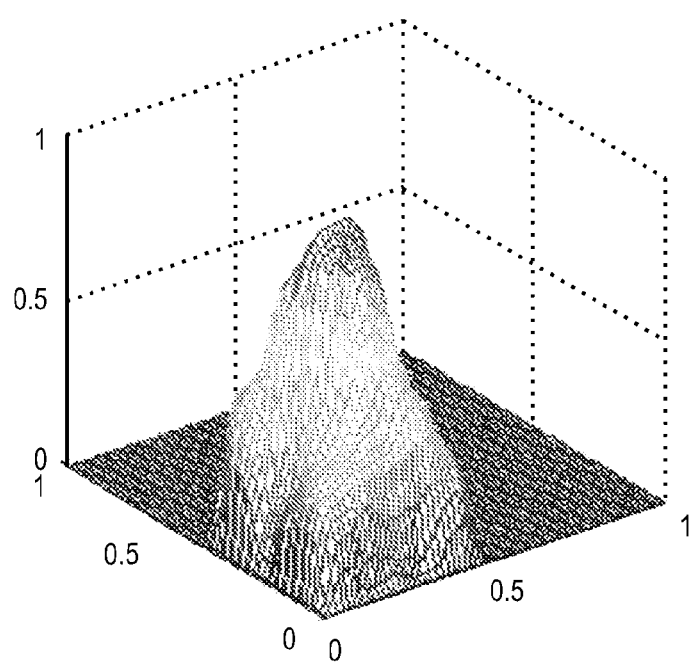
FIG. 13 is an example of algebraic multiscale function, in accordance with an exemplary embodiment of the present techniques.

FIG. 13 is an example of algebraic multiscale function 1300, in accordance with an exemplary embodiment of the present techniques. It can be noted that the computation of the algebraic multiscale functions is easier than the solution discussed with respect to FIG. 12. Given the global fine matrix A rows and columns may be selected for the points in the support of the coarse point to form the matrix A, as shown in Eqn. 9.

$$A = \begin{bmatrix} a_{f_1 f_1} & a_{f_1 c} & a_{f_1 f_2} \\ 0 & 1 & 0 \\ a_{f_2 f_1} & a_{f_2 c} & a_{f_2 f_2} \end{bmatrix} \begin{matrix} \leftarrow \text{row } f_1 \\ \leftarrow \text{row } c, b = \\ \leftarrow \text{row } f_2 \end{matrix} \begin{bmatrix} 0 \\ 1 \\ 0 \end{bmatrix}, \quad \text{Eqn. 9}$$

or equivalently (c=1):

$$\begin{bmatrix} a_{f_1 f_1} & a_{f_1 f_2} \\ a_{f_2 f_1} & a_{f_2 f_2} \end{bmatrix} \begin{bmatrix} f_1 \\ f_2 \end{bmatrix} = - \begin{bmatrix} a_{f_1 c} \\ a_{f_2 c} \end{bmatrix}$$

Eqn. 9 represents the linear problem to be solved after setting the right hand side to one for the particular coarse point and zero for all other points. One linear problem is solved for each coarse point.

It can be noted that geometric information is not used to compute these basis functions. Thus, an algebraic multiscale basis may be useful for calculating basis functions on unstructured meshes. Once the local problems have been solved, they can be rescaled to ensure that the basis functions sum to one. This may be performed using the formula in Eqn. 10.

$$f_c^i(x) = \frac{f_c^i(x)}{\sum_j f_c^j(x)}. \quad \text{Eqn. 10}$$

Other approaches may be used to calculate basis functions in exemplary embodiments of the current techniques. For example, all coarse functions may be computed simultaneously in such a way as to minimize the energy of the basis function. This procedure may be termed the energy minimizing basis. The energy minimizing basis function may be expressed mathematically as shown in Eqn. 11.

$$\min \frac{1}{2} \sum_{i=1}^{m} f_c^i(x)^T A_c^i f_c^i(x), \text{ such that } \sum_{i=1}^{m} f_c^i(x) = 1. \quad \text{Eqn. 11}$$

Figure 14:
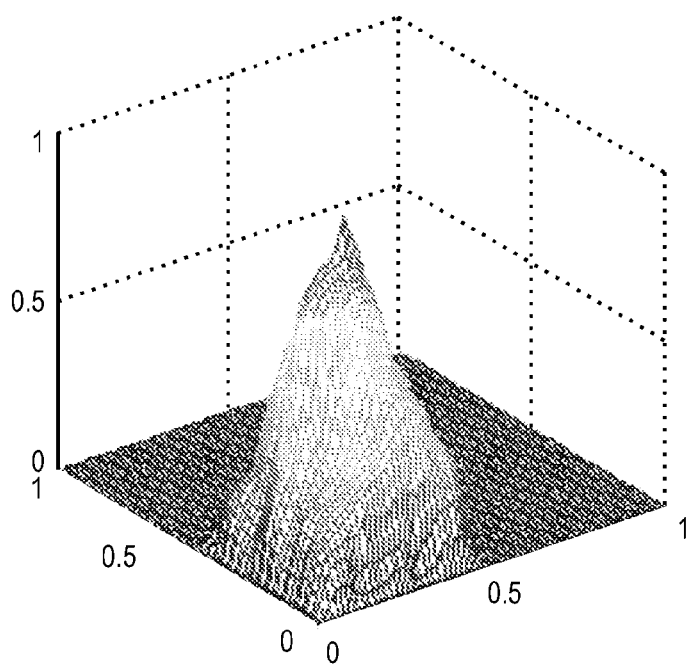
FIG. 14 is an illustration of an energy minimizing basis function, in accordance with an exemplary embodiment of the present techniques.

FIG. 14 is an illustration of an energy minimizing basis function, in accordance with an exemplary embodiment of the present techniques. The techniques described above may be brought together to implement a mixed multiscale finite volume method.

Mixed Multiscale Finite Volume (MsMFV) Method
Approximating a Mesh Segment

Other approaches may be used to calculate basis functions in exemplary embodiments of the current techniques. For example, all coarse functions may be computed simultaneously in such a way as to minimize the energy of the basis function. This procedure may be termed the energy minimizing basis. The energy minimizing basis function may be expressed mathematically as shown in Eqn. 11.

$$\min \frac{1}{2} \sum_{i=1}^{m} f_c^i(x)^T A_c^i f_c^i(x), \text{ such that } \sum_{i=1}^{m} f_c^i(x) = 1. \quad \text{Eqn. 11}$$

FIG. 14 is an illustration of an energy minimizing basis function 1400, in accordance with an exemplary embodiment of the present techniques. The techniques described above may be brought together to implement a mixed multiscale finite volume method.

In order to simplify the explanation of the first algorithm used for the approximation of segments, it may be assumed that $a, b \in \Sigma_h$ and the starting point is a. This algorithm is hereinafter referred to as the "First Algorithm." To begin, the points a and b can be connected with a straight line, providing a set I=0 and $a=a_0$. Select the connection coming from $a_i$ and the point of $\Sigma_h$ that is closest to [a,b], if not already chosen. This point can be set to be $a_{i+1}$. Connect $a_i$ to $a_{i+1}$. If $a_{i+1} \neq b$ set i=i+1. Repeat the same for point $a_{i+1}$. If point b has been reached, the approximation of segments is finished. While the First Algorithm is useful for constructing two dimensional meshes, additional tools are needed for constructing three dimensional meshes.

A second algorithm provides for the approximation of polygonal surfaces for three dimensional meshes. This algorithm is hereinafter referred to as the "Second Algorithm." Given a polygonal surface and the approximation of its edges constructed by the First Algorithm, one vertex of the polygonal surface may be selected. There at least two segments coming out of the vertex. Select two that belong to a face (polygonal surface) of the fine mesh. If there is a point in this polygonal surface that has not been approximated before and has at least two segments out of it, repeat the same procedure. If line segments from all points have been approximated, then the approximation is completed.

Once the polygons on the mesh have been approximated, the MsMFVM can be constructed. To begin, the coarse basis functions may be generated, as described with respect to FIGS. 10-13, above.

Figure 15:
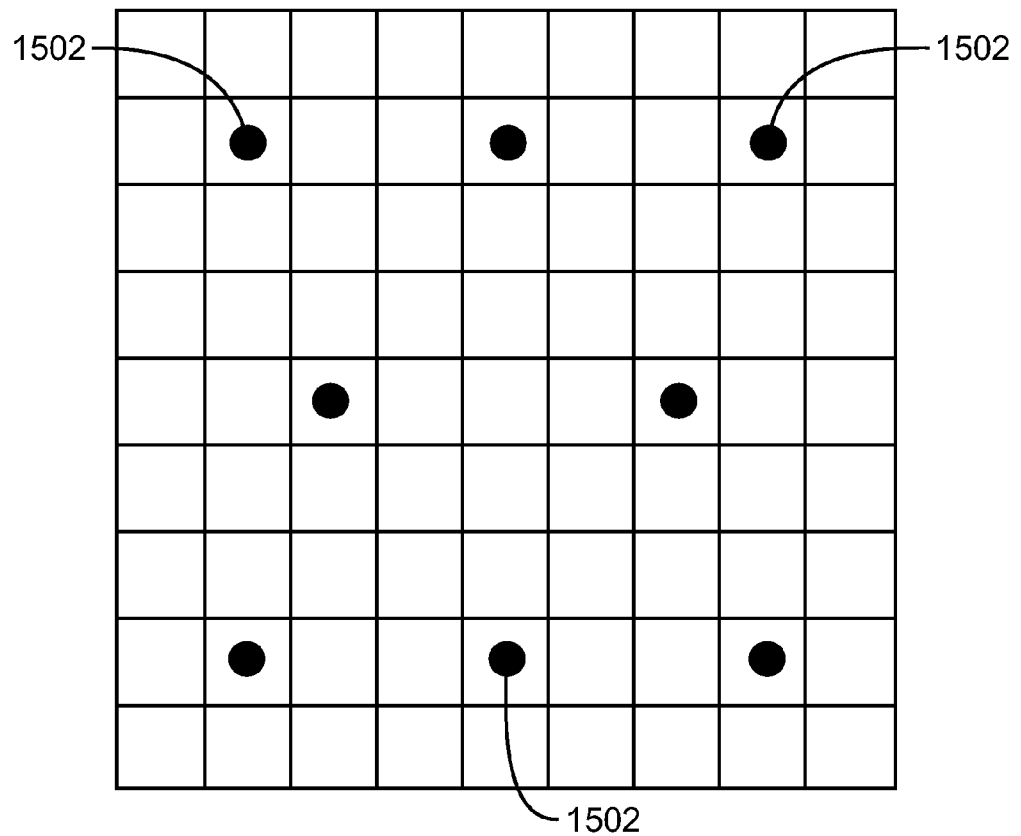
FIG. 15 is an illustration of a fine computational mesh illustrating the coarse points selected in the process, in accordance with an exemplary embodiment of the present techniques.

FIG. 15 is an illustration of a fine computational mesh 1500 illustrating the coarse points 1502 selected in the process, in accordance with an exemplary embodiment of the present techniques. The dual mesh, i.e., the interaction region, can then be constructed. This may be performed by building a triangulation of the coarse points 1502. The triangulation will include triangles in two dimensional meshes and tetrahedral or prisms in three dimensional meshes.

Figure 16:
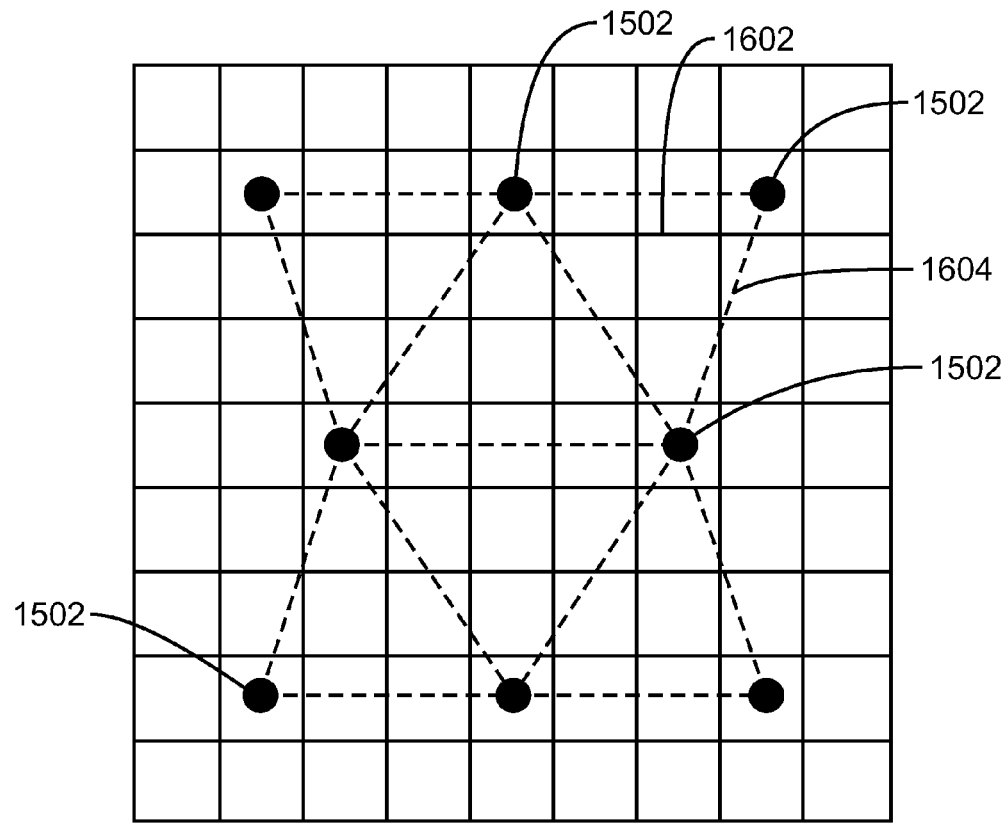
FIG. 16 is an illustration of the triangulation of the coarse points within the fine computational mesh, with six triangles created by connecting each of the coarse points with a line segment, in accordance with an exemplary embodiment of the present techniques.

FIG. 16 is an illustration of the triangulation of the coarse points 1502 within the fine computational mesh 1500, with six triangles 1602 created by connecting each of the coarse points 1502 with a line segment 1604, in accordance with an exemplary embodiment of the present techniques. Every edge (line segments 1604) of the triangulation can then be approximated using the First Algorithm. The points are the centers of the fine mesh cells and we move on the edges of the interaction region (the dual mesh). In other words, some of the fine mesh points (the centers of the cells) may be selected to be coarse mesh points. Next, the basis functions are built. Finally, the dual mesh is built by first building the edges (using the first algorithm), and after that the faces are built (using the second algorithm).

Figure 17:
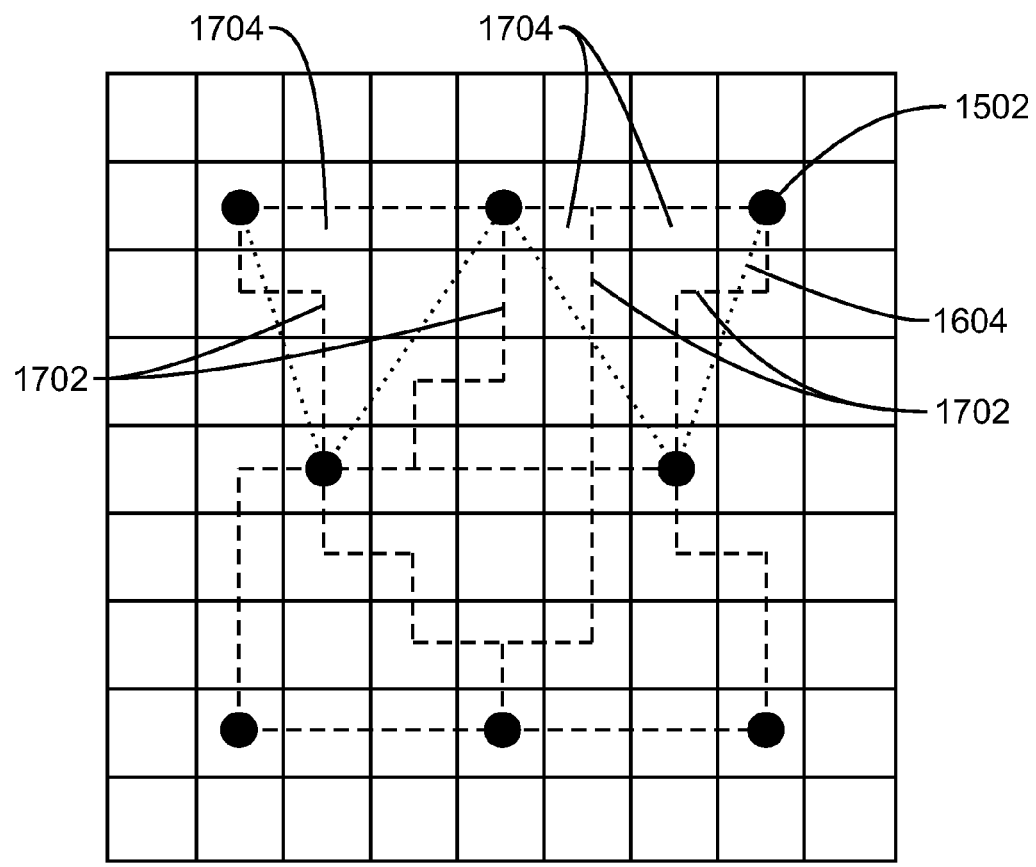
FIG. 17 is an illustration of the rectangular computational mesh, showing the results of an approximation to the triangulation, in accordance with an exemplary embodiment of the present techniques.

FIG. 17 is an illustration of the rectangular computational mesh 1500, showing the results of an approximation to the triangulation, in accordance with an exemplary embodiment of the present techniques. The line segments 1604 that were the edges of each original triangle 1602 (FIG. 16) are approximated by line segments 1702, creating six polygons 1704 that correspond to the triangles 1602. The approximation of the edges (line segments 1604) by the line segments 1604 becomes more accurate when the fine mesh 1500 is unstructured. The faces that are spanned by the approximated edges 1702 may be approximated using the Second Algorithm.

Generating the Primary Mesh

Figure 18:
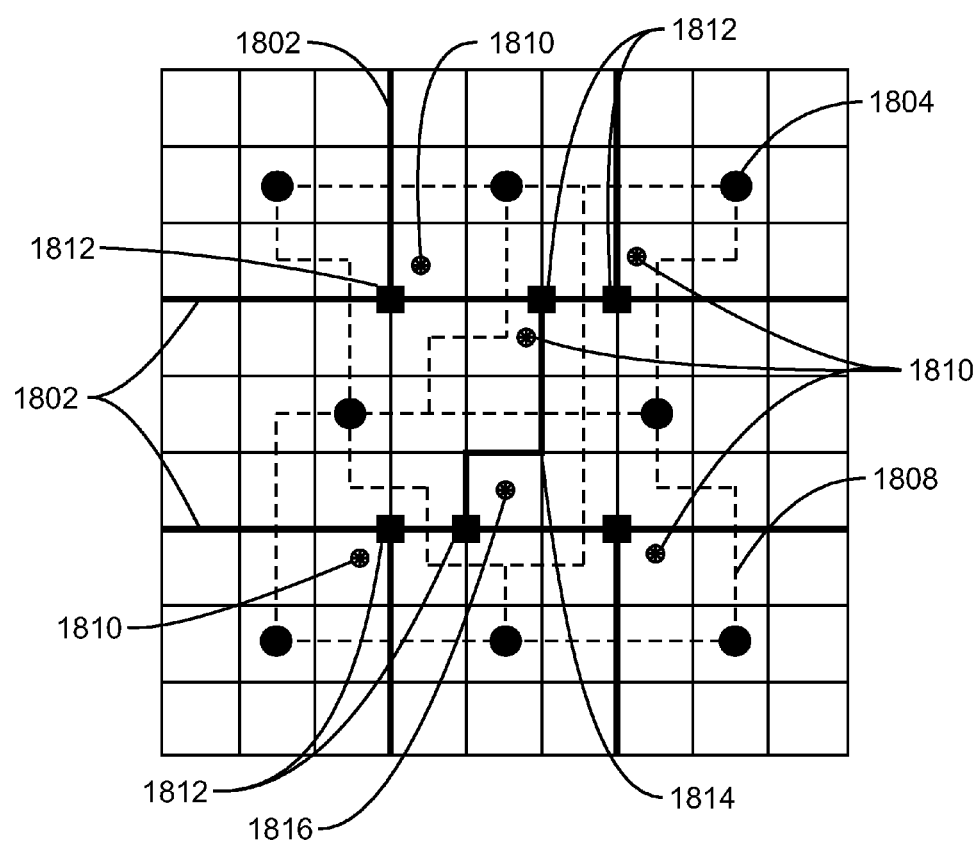
FIG. 18 is an illustration of a fine rectangular computational mesh showing the generation of a primary mesh, in accordance with an exemplary embodiment of the present techniques.

FIG. 18 is an illustration of the rectangular computational mesh 1500 showing the generation of a primary mesh (indicated by thick lines 1802), in accordance with an exemplary embodiment of the present techniques. The coarse mesh points 1804 are used to construct the coarse interaction regions 1806 (outlined by dashed lines 1808) using the procedure discussed above. A primary mesh is generated by first selecting a point 1810 inside each coarse interaction region 1806. The point 1810 selected may often be the "center of mass" of the interaction region 1806. Next, the closest vertex of the primary fine mesh to the selected point 1810 may be identified. The closest point will be identified as the center point 1812 of the interaction region 1806. If there are more than one point in the fine mesh (e.g., 1814) that are at the same distance to the selected point 1816, the first point can be chosen as the center point 1812. After identifying the center point 1812 in each interaction region 1806, a point on the fine mesh that is closest to the center of each edge (dashed lines 1808) of the coarse interaction regions 1806 is selected to be the "center" of the edge. The First Algorithm can then be used to connect the center of the interaction region to center of the edge. The center points 1812 become vertices in the fine primary mesh (indicated by thick lines 1802).

Next, the edges of the primary mesh (indicated by thick lines 1802) are considered. If the problem is two dimensional this is the coarse primary mesh. For three dimensional problems, these are the edges of the faces of the coarse primary mesh. From the edges, the Second Algorithm can be used to construct the faces.

Constructing the Velocity Field.

Figure 19:
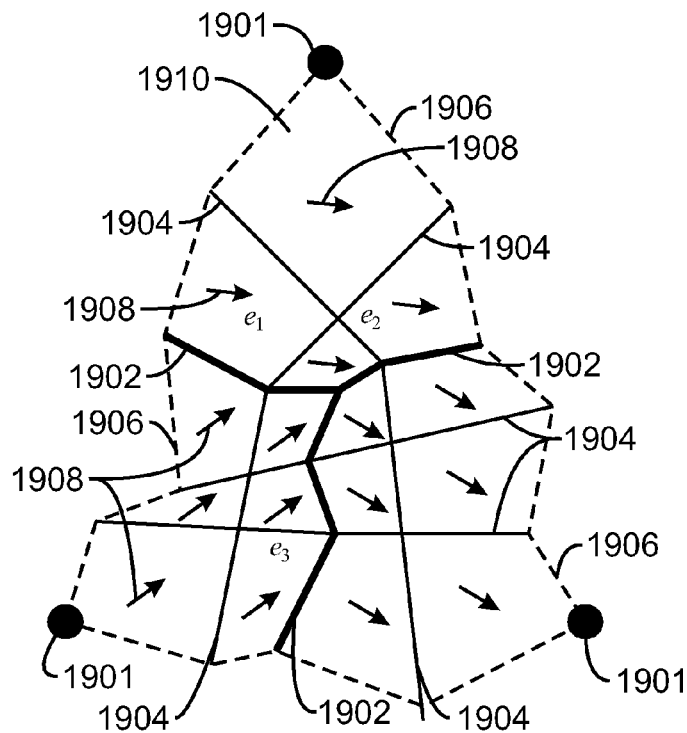
FIG. 19 is an illustration of a computational mesh with a triangular interaction region, showing a constant velocity field, in accordance with embodiments of the present techniques.
Figure 20:
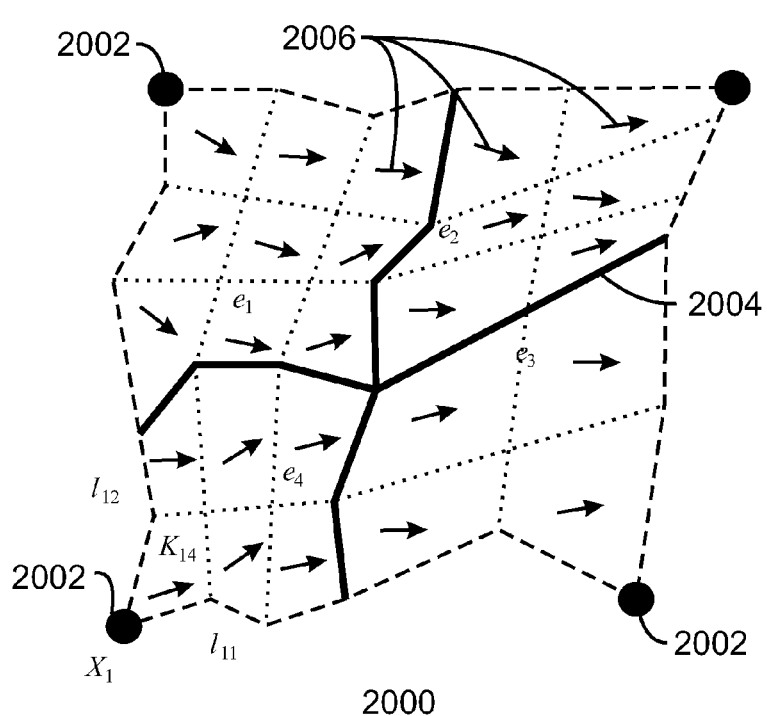
FIG. 20 is a computational mesh with a quadrilateral interaction region 2000, in accordance with embodiments of the present techniques.

There are two possible cases for computing a basis function for the velocity field. The first case is when the interaction region is similar to a triangle, as shown in FIG. 19. The second case is when the interaction region is quadrilateral, as shown in FIG. 20. Usually the quadrilateral case can be split into two triangles, but frequently it is more convenient to keep the quadrilateral. Further, there are multiple approaches to construct the velocity field. For example, a constant approximation for the velocity may be used. As the velocity may vary, a multiscale velocity approximation may also be used.

FIG. 19 is an illustration of a computational mesh with a triangular interaction region 1900, showing a constant velocity field, in accordance with embodiments of the present techniques. The coarse center points 1901 are selected and used to generate the coarse interaction region 1900, as discussed with respect to FIGS. 15-17. The constant velocity field is the simplest approximation of the velocity and it is constructed using the techniques presented above. The thick lines 1902 are the boundaries of the coarse cells, the thin lines 1904 are the boundaries of the fine cells and the dashed lines 1906 are the boundaries of the interaction region. The velocity field (indicated by arrows 1908) will be constant in each part 1910 of the interaction region 1900 and will have continuous normal components. The velocity calculated is the average velocity across the interaction region 1900. In many cases that provides sufficient accuracy, while avoiding the overhead from more complex calculations. However, the constant approximation does not take into account the variation of the coefficients, and it may be useful to take a more comprehensive approach in some simulations.

FIG. 20 is a computational mesh with a quadrilateral interaction region 2000, in accordance with embodiments of the present techniques. The coarse center points 2002 are selected and used to generate the interaction region 2000 using the techniques discussed above. The edges 2004 between the computational cells are indicated by thick lines. The velocity 2006 of the flows are indicated by the arrows.

Better approximations of the velocity can be constructed by using better basis functions. Two basis functions are used for each interaction sub region. For example, for the interaction sub region $K_{14}$ with boundaries $e_1, e_2, l_{11}, l_{12}$ the problems illustrated in Eqn. 8 are solved using Mixed Finite Volume or Mixed Finite Element discretizations, as shown in Eqn. 12.

$$\begin{array}{llll} -div(v_1) = 0, & \text{in } K_{14}, & -div(v_2) = 0, & \text{in } K_{14}, \\ v_1 \cdot n = 1, & \text{on } e_4, & v_2 \cdot n = 0, & \text{on } e_4, \\ v_1 \cdot n = -1, & \text{on } l_{12},, & v_2 \cdot n = 0, & \text{on } l_{12}, \\ v_1 \cdot n = 0, & \text{on } e_1, & v_2 \cdot n = 1, & \text{on } e_1, \\ v_1 \cdot n = 0, & \text{on } l_{11} & v_2 \cdot n = -1, & \text{on } l_{11} \end{array} \qquad \text{Eqn. 12}$$

Alternatively, the basis functions can be constructed by solving Eqn. 12 in two adjacent sub regions. Note that if the coefficients are the same in each fine cell in the sub region $K_{14}$, the basis functions $v_1$ and $v_2$ are constants and coincide with the basis in the Examples of Mixed Finite Volume Grids, discussed above. Thus, as shown in FIG. 20, the local velocities are not the same anymore. Accordingly, each function in the velocity basis is constructed to be piecewise constant and has continuous normal components.

In the exemplary embodiment of the present techniques presented above, the primary and the dual meshes and the approximation spaces $P_h$ and $U_h$ have been constructed. Test space $Q_h$ may be chosen as the space of piecewise constants on the volumes of the primary mesh. The space $V_h$ is the space of piecewise constant vector functions with continuous normal components. Other spaces may be used in embodiments, for example, $P_h = Q_h$ and $U_h = V_h$. These spaces may have the same approximation properties, but require slightly more computations.

Use of Global Information

Global information about the reservoir can be used to improve the quality of the coarse mesh solution. For example, global information may be used in the computation of the basis functions for the velocity. If the behavior of the flow is known, either by solving a simplified problem or from the geologic information, then a vector field w may be determined on a mesh finer than the coarse mesh. Thus, an intermediate auxiliary mesh may be selected, i.e., an auxiliary mesh that is finer than the coarse mesh, but coarser than the fine mesh. The coarse basis functions can be computed on the edge e using the formula shown in Eqn. 13.

$$v \cdot n_{|e_i} = \frac{w \cdot n_{|e_i}}{\int_e w \cdot n}, \; i = 1, 2, \ldots, k, \qquad \text{Eqn. 13}$$

where w has been computed on the intermediate mesh.

In Eqn. 13, the edge is divided into k parts. This will change the shape of the basis functions.

Figure 21:
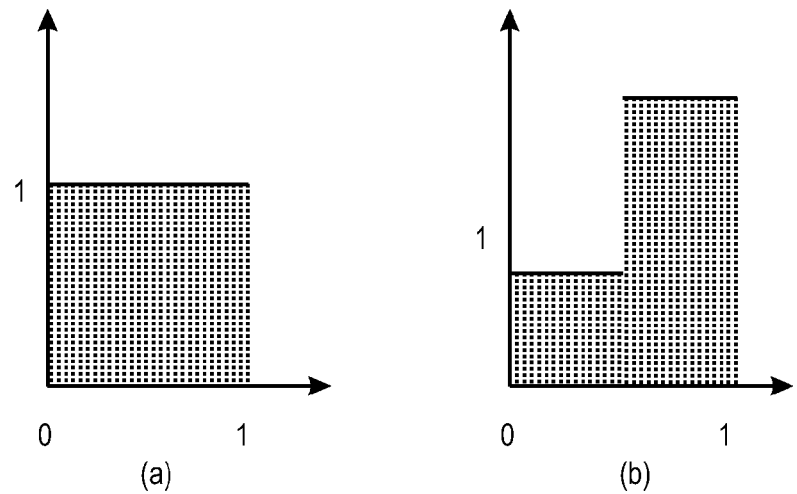
FIG. 21 is a graph showing a non-uniform basis function, in accordance with an exemplary embodiment of the present techniques.

FIG. 21 is a graph 2100 showing a non-uniform basis function, in accordance with an exemplary embodiment of the present techniques. In this example, the left flux (a) is uniform. By comparison, however, the right flux (b) is not uniform, having three times more flow in the second half. Generally, this may correspond to a formation having a more permeable rock layer along one side. The shape of the basis functions will change the behavior of the flow during the simulation.

Note that $$\int_e v \cdot n = 1 \text{ and,}$$

therefore, the basis functions in Eqn. 8 may be calculated using the modified problem shown in Eqn. 14.

$$\begin{aligned}
-div(v_1) = 0, & \quad \text{in } K_{14}, & -div(v_2) = 0, & \quad \text{in } K_{14}, \\
\int_{e_4} v_1 \cdot n = 1, & \quad \text{on } e_4, & v_2 \cdot n = 0, & \quad \text{on } e_4, \\
& & v_2 \cdot n = 0, & \quad \text{on } l_{12}, \\
\int_{l_{12}} v_1 \cdot n = -1, & \quad \text{on } l_{12}, & \int_{e_1} v_2 \cdot n = 1, & \quad \text{on } e_1, \\
v_1 \cdot n = 0, & \quad \text{on } e_1, & & \\
v_1 \cdot n = 0, & \quad \text{on } l_{11} & \int_{l_{11}} v_2 \cdot n = -1, & \quad \text{on } l_{11}
\end{aligned} \qquad \text{Eqn. 14}$$

Calculation of the Consistent Velocity

Figure 22:
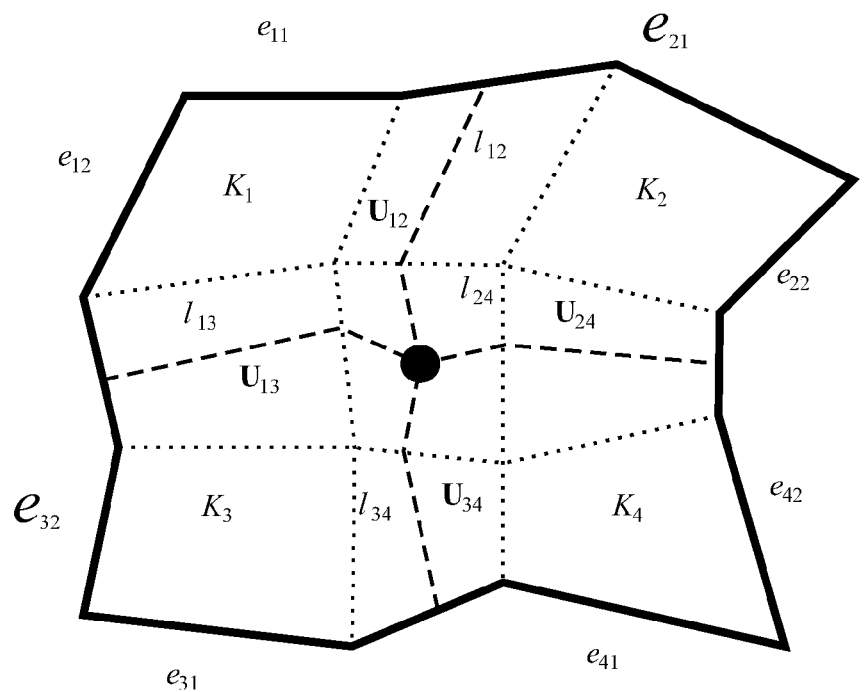
FIG. 22 is an illustration of an interaction region showing the calculation of fine total velocity, in accordance with an exemplary embodiment of the present techniques.

FIG. 22 is an illustration of a coarse grid cell showing the calculation of fine total velocity, in accordance with an exemplary embodiment of the present techniques. Regardless of whether constant velocity or variable velocity is used, the first step is to compute the total velocity using the approximation u produced by the Mixed Multiscale Finite Volume method, as discussed herein. That may be sufficient for some cases, but when more accurate total velocity on the fine mesh is desired, the results can be post processed to get more accuracy. The first approach is to solve Eq. 5, but with Neumann boundary conditions, i.e., as shown in Eqn. 15.

$$-div(K \nabla p(x)) = f(x) \text{ in } K$$

$$-K \nabla p(x) \cdot n = u_{H|\partial K} \cdot n \text{ on } \partial K \qquad \text{Eqn. 15}$$

Eqn. 15 uses Mixed Finite Volume or Mixed Finite Element method on the fine mesh. This approach can be computationally expensive. Another way is to solve a coarse problem using the Mixed Finite Volume framework. First the basis functions $v_{12}$, $v_{13}$, $v_{24}$, $v_{34}$, may be calculated using the formulations in Eqn. 16.

$$\begin{aligned}
-div(v_{12}) = 0, & \quad \text{in } K_1 \cup K_2, & -div(v_{13}) = 0, & \quad \text{in } K_1 \cup K_3, \\
v_{12} \cdot n = 1, & \quad \text{on } l_{12}, & v_{13} \cdot n = 1, & \quad \text{on } l_{13}, \\
v_{12} \cdot n = 0, & \quad \text{on } l_{13} \cup l_{24}, & v_{13} \cdot n = 0, & \quad \text{on } l_{12} \cup l_{34}, \\
v_{12} \cdot n = 0, & \quad \text{on } e_{11} \cup e_{12}, & v_{13} \cdot n = 0, & \quad \text{on } e_{11} \cup e_{12}, \\
v_{12} \cdot n = 0, & \quad \text{on } e_{21} \cup e_{22}, & v_{13} \cdot n = 0, & \quad \text{on } e_{31} \cup e_{32} \\
\\
-div(v_{24}) = 0, & \quad \text{in } K_2 \cup K_4, & -div(v_{34}) = 0, & \quad \text{in } K_3 \cup K_4, \\
v_{24} \cdot n = 1, & \quad \text{on } l_{24}, & v_{34} \cdot n = 1, & \quad \text{on } l_{34}, \\
v_{24} \cdot n = 0, & \quad \text{on } l_{12} \cup l_{34}, & v_{34} \cdot n = 0, & \quad \text{on } l_{13} \cup l_{24}, \\
v_{24} \cdot n = 0, & \quad \text{on } e_{21} \cup e_{22}, & v_{34} \cdot n = 0, & \quad \text{on } e_{31} \cup e_{32}, \\
v_{24} \cdot n = 0, & \quad \text{on } e_{41} \cup e_{42}, & v_{34} \cdot n = 0, & \quad \text{on } e_{41} \cup e_{42}
\end{aligned} \qquad \text{Eqn. 16}$$

Similarly the basis functions for the velocity on the outside edges are calculated. The computations in Eqn. 16 are done only once. They uniquely define the space U. The space V can be the same as U or just of piecewise constants. The space P is the space of the piecewise constants or bilinear functions and the space Q consists of piecewise constants. The next step is to solve for u and p in the discretized version of Eqn. 15. This is performed by solving a small system of equations for each coarse cell. The computed fine mesh fluxes are consistent in all fine cells. The procedure is not limited to velocities, but may be used for improving the fine mesh approximation and consistency of any vector variable. This can be the total velocity, the phase velocities, or some other vector variable of interest.

Application of the Multilevel Mixed Multiscale Finite Volume Method for Simulation of Flow in Porous Media.

Figure 23:
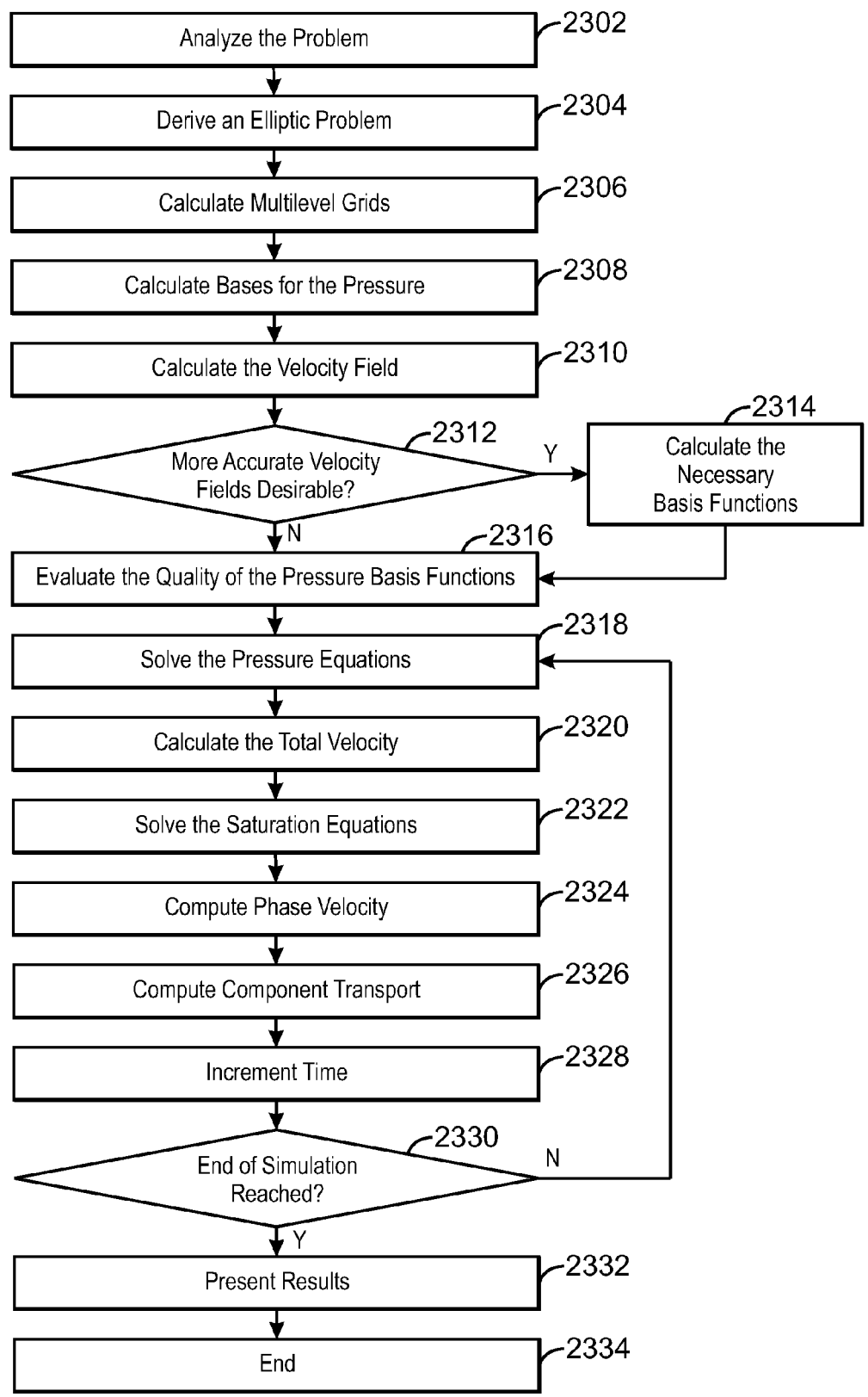
FIG. 23 is a process flow diagram, showing a method for performing a simulation using the techniques described herein, in accordance with an exemplary embodiment of the present techniques.

FIG. 23 is a process flow diagram, showing a method 2300 for performing a simulation using the techniques described herein, in accordance with an exemplary embodiment of the present techniques. In this exemplary embodiment, the general goal is to perform a reservoir simulation with the model described by Eqn. 1 and Eqn. 4. This is an extension of the process flow diagram shown in FIG. 4. The method begins at block 2302 with the analysis of the problem. The analysis includes collecting the global information for the behavior of the flow across the reservoir. At this point, a decision may be made as to whether using global information will be beneficial. The global information can be gathered from a simplified simulation or may be provided by experts.

At block 2304, an elliptic problem based on Eqn. 4 is derived. The elliptical problem is a simplification of Eqn. 4, created by skipping the time derivative. The multilevel meshes are calculated at block 2306, as described herein. At block 2308, the bases are calculated for the multilevel meshes. At block 2310, the uniform velocity field associated with the pressure is calculated. If at block 2312, a decision is made that a more accurate velocity field (e.g., with varying pressures) is desirable, more accurate bases functions are calculated at block 2314. In either case, flow proceeds to block 2316. At block 2316, the quality of the pressure basis functions is evaluated. This may be performed by determining how good the approximation is, for example, by history matching to flow data from the reservoir. If any of the basis functions are not as good as desired, they may be recalculated. Flow then proceeds to block 2318.

Block 2318 marks the start of an iterative simulation process. At block 2318, the pressure equation shown in Eqn. 1 is discretized using the Multilevel Mixed Multiscale Finite Volume Method described herein and then is solved. Some of the coefficients may be recomputed at each time step with the data from the previous time step. At block 2320, the total velocity is calculated. To perform this function, the coarse mesh total velocity flux is calculated using the solution from block 2310. Then, if desirable, the fine mesh total velocity is computed using either the velocity basis functions computed at block 2310 or at block 2314.

At block 2322, the saturation equation, shown in Eqn. 4, is solved. The saturation equation can be solved either implicitly on the coarse mesh or explicitly on the fine mesh. An adaptive solution is also possible. For example, after an implicit coarse solution of the saturation, the coarse cells in which the saturations change above given tolerance can be selected and fine mesh problems can be solved for the fine mesh problems using the boundary conditions from the coarse mesh solve. Several fine time steps can be performed until the coarse time step is reached. The fine time step may be selected so that the fine mesh explicit saturation problems are stable and a multiple of the fine mesh time step is equal to the coarse mesh time step.

At block 2324, the phase velocity may be computed, and at block 2326, the component transport is computed. These calculations may be performed in a similar fashion to the calculation of the total velocity at block 2324. An adaptive algorithm, as described at block 2322, can be used. Different phases and components may use different adaptive regions.

At block 2328, the time is incremented by the time step selected. This step may depend on the total time for the simulation. For example, the total simulation may cover 1 year, 5 years, 20 years, 40 years or more. The time step increments may cover 1 month, 2 months, 6 months, 1 year, or more. At block 2330, the incremented time is compared to the initial time set for the simulation. If the time indicates that the end of the simulation has not been reached, process flow returns to block 2316 to continue with another iteration. If the simulation has ended, process flow proceeds to block 2332. At block 2332, the results of the simulation are stored in a non-transitory, computer readable medium, and may be presented to a user, for example, by being used to calculate a visual representation of a physical reservoir. After the results are presented, at block 2334, the procedure ends.

Use of the Techniques in Hydrocarbon Harvesting

In exemplary embodiments, the method 2300 may be used to locate hydrocarbons in a reservoir or adjust production from a hydrocarbon field. This includes generating a reservoir simulation model that is based on a Multilevel Mixed Multiscale Finite Volume Model. Control of hydrocarbon production from the field can be adjusted based at least in part on results obtained from the reservoir model.

Adjusting the control of hydrocarbon production from the field may include changing injection pressures, converting injectors to producers, converting producers to injectors, drilling more wells to the reservoir, or any combinations thereof. The static geologic measurements may include transmissibility, pore volume, drainage volume, minimum cumulative inverse transmissibility between wells or between a well and a cell representing a portion of the reservoir, transit time, or any combinations thereof.

Exemplary Cluster Computing System

Figure 24:
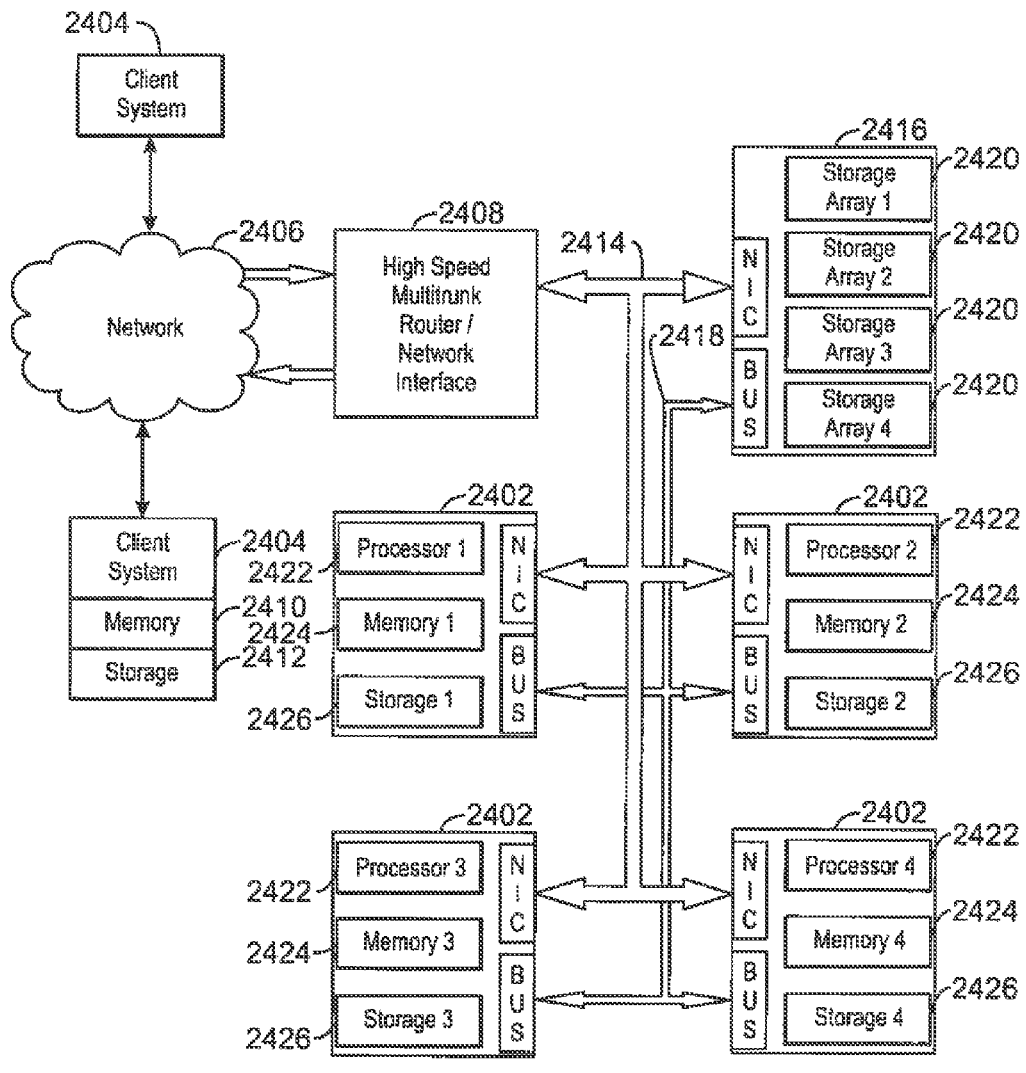
FIG. 24 is a block diagram of an exemplary cluster computing system that may be used in exemplary embodiments of the present techniques.

FIG. 24 is a block diagram of an exemplary cluster computing system 2400 that may be used in exemplary embodiments of the present techniques. The cluster computing system 2400 illustrated has four computing units 2402, each of which may perform calculations for part of the simulation model. However, one of ordinary skill in the art will recognize that the present techniques are not limited to this configuration, as any number of computing configurations may be selected. For example, a small simulation model may be run on a single computing unit 2402, such as a workstation, while a large simulation model may be run on a cluster computing system 2400 having 10, 100, 1000, or even more computing units 2402. In an exemplary embodiment, each of the computing units 2402 will run the simulation for a single subdomain or group of computational cells. However, allocation of the computing units 2402 may be performed in any number of ways. For example, multiple subdomains may be allocated to a single computing unit 2402 or multiple computing units 2402 may be assigned to a single subdomain, depending on the computational load on each computing unit 2402.

The cluster computing system 2400 may be accessed from one or more client systems 2404 over a network 2406, for example, through a high speed network interface 2408. The network 2406 may include a local area network (LAN), a wide area network (WAN), the Internet, or any combinations thereof. Each of the client systems 2404 may have non-transitory, computer readable memory 2410 for the storage of operating code and programs, including random access memory (RAM) and read only memory (ROM). The operating code and programs may include the code used to implement all or any portions of the methods discussed herein, for example, as discussed with respect to FIG. 23. Further, the non-transitory computer readable media may hold a data representation of a physical hydrocarbon reservoir, for example, generated by a multilevel mixed multiscale finite volume (MMMFV) on an unstructured mesh. The client systems 2404 can also have other non-transitory, computer readable media, such as storage systems 2412. The storage systems 2412 may include one or more hard drives, one or more optical drives, one or more flash drives, any combinations of these units, or any other suitable storage device. The storage systems 2412 may be used for the storage of code, models, data, and other information used for implementing the methods described herein. For example, the data storage system may hold a data representation of a physical hydrocarbon reservoir, generated, at least in part, using a multilevel mixed multiscale finite volume (MMMFV) method on an unstructured mesh.

The high speed network interface 2408 may be coupled to one or more communications busses in the cluster computing system 2400, such as a communications bus 2414. The communication bus 2414 may be used to communicate instructions and data from the high speed network interface 2408 to a cluster storage system 2416 and to each of the computing units 2402 in the cluster computing system 2400. The communications bus 2414 may also be used for communications among computing units 2402 and the storage array 2416. In addition to the communications bus 2414 a high speed bus 2418 can be present to increase the communications rate between the computing units 2402 and/or the cluster storage system 2416.

The cluster storage system 2416 can have one or more tangible, computer readable media devices, such as storage arrays 2420 for the storage of data, visual representations, results, code, or other information, for example, concerning the implementation of and results from the methods of FIG. 23. The storage arrays 2420 may include any combinations of hard drives, optical drives, flash drives, holographic storage arrays, or any other suitable devices.

Each of the computing units 2402 can have a processor 2422 and associated local tangible, computer readable media, such as memory 2424 and storage 2426. The memory 2424 may include ROM and/or RAM used to store code, for example, used to direct the processor 2422 to implement the method illustrated in FIG. 23. The storage 2426 may include one or more hard drives, one or more optical drives, one or more flash drives, or any combinations thereof. The storage 2426 may be used to provide storage for intermediate results, data, images, or code associated with operations, including code used to implement the method of FIG. 23.

The present techniques are not limited to the architecture or unit configuration illustrated in FIG. 24. For example, any suitable processor-based device may be utilized for implementing all or a portion of embodiments of the present techniques, including without limitation personal computers, networks personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

The invention claimed is:

1. A method for modeling a hydrocarbon reservoir, comprising:
    deriving a computational mesh from a fine unstructured mesh using a multilevel mixed multiscale finite volume (MMMFV) method, comprising:
        constructing an interaction region;
        generating a primary mesh;
        computing a first algebraic multilevel basis function for a pressure, wherein the first algebraic multilevel basis function is based at least in part on a discrete harmonic function;
        computing a second algebraic multiscale basis function for a velocity approximation, wherein the second algebraic multiscale basis function is solved to satisfy the following:

$$-div(v_1) = 0, \text{ in } K_{14}, \quad -div(v_2) = 0, \text{ in } K_{14},$$
$$v_1 \cdot n = 1, \text{ on } e_4, \quad v_2 \cdot n = 0, \text{ on } e_4,$$
$$v_1 \cdot n = -1, \text{ on } l_{12}, \quad v_2 \cdot n = 0, \text{ on } l_{12},$$
$$v_1 \cdot n = 0, \text{ on } e_1, \quad v_2 \cdot n = 1, \text{ on } e_1,$$
$$v_1 \cdot n = 0, \text{ on } l_{11}, \quad v_2 \cdot n = -1, \text{ on } l_{11},$$

wherein $K_{14}$ represents an interaction sub region with boundaries $e_1$, $e_4$, $l_{11}$, and $l_{12}$, and wherein the basis functions $v_1$ and $v_2$ are constants when the coefficients are the same in each fine cell in the sub region $K_{14}$; and
    simulating the hydrocarbon reservoir using the computational mesh; and
    generating a data representation of a physical hydrocarbon reservoir in a non-transitory, computer-readable medium based at least in part on the results of the simulation.

2. The method of claim 1, further comprising:
    using global information in the construction of the second algebraic multiscale basis function by:
    selecting an auxiliary mesh;
    approximating a solution on the auxiliary mesh; and
    calculating one or more velocity basis functions using the provided global information.

3. The method of claim 1, wherein, the second algebraic multiscale basis function is based at least in part on a discrete harmonic function.

4. The method of claim 1, wherein deriving the computational mesh comprises:
    calculating a primary mesh and one or more interaction regions;
    selecting approximation spaces, wherein the approximation spaces comprise pressure and velocity;
    selecting test spaces, where the test spaces comprise a first test space and a second test space and; and
    selecting discrete gradient and divergence operators.

5. The method of claim 1, wherein computing the first algebraic multilevel basis function comprises:
    setting a plurality of boundary conditions to one at a center point of a coarse computational cell in the primary mesh;
    setting the plurality of boundary conditions to zero at a boundary of the coarse computational cell in the primary mesh; and
    solving a basis function using the plurality of boundary conditions.

6. The method of claim 1, wherein computing the first algebraic multilevel basis function comprises:
    computing all coarse functions for a computational mesh simultaneously so as to minimize an energy of a computational mesh.

7. The method of claim 1, wherein computing the first algebraic multilevel basis function comprises:
    selecting one or more coarse points;
    selecting one or more fine points that belong to each coarse point;
    computing a coarse basis; and
    evaluating an approximation quality of the coarse basis.

8. The method of claim 7, further comprising:
    iterating until the approximation quality is acceptable.

9. The method of claim 7, wherein computing the coarse basis comprises:
    connecting two points, $a_i$ and b, in a computational mesh $\Sigma_h$ with a straight line $[a_i, b]$;
    assigning a point in $\Sigma_h$ that is closest to the straight line $[a_i, b]$ to be $a_{i+1}$; generating a connecting line from $a_i$ to $a_{i+1}$; and if $a_{i+1} \neq b$, setting i=i +1,
    selecting another connection and repeating.

10. The method of claim 7, wherein computing the coarse basis comprises:
    selecting a center point of the interaction region;
    selecting a center point of one or more edges of the interaction region;
    connecting the center point of the interaction region to the center point of an edge; and
    connecting the one or more edges to form faces of polygons.

11. The method of claim 1, wherein constructing the interaction region comprises:
constructing a triangulation of coarse points by:
constructing each edge of the triangulation by:
connecting two coarse points, $a_i$ and b in a computational mesh $\Sigma_h$ with a straight line $[a_i, b]$;
assigning a point in $\Sigma_h$ to be $a_{i+1}$, wherein the point is closest to the straight line $[a_i, b]$;
generating a connecting line from $a_i$ to $a_{i+1}$; and if $a_{i+1} \neq b$, setting i=i+1, and repeating until $a_{1+1}=b$;
selecting another connection and repeating; and
constructing one or more faces of the triangulation by:
selecting a center point of an interaction region;
selecting a center point of one or more edges of the interaction region;
connecting the center point of the interaction region to the center point of an edge; and
connecting one or more faces of polygons.

12. The method of claim 1, further comprising:
managing a production of a hydrocarbon from the physical hydrocarbon reservoir based at least in part upon data representation.

13. The method of claim 12, wherein managing the production comprises one or more of:
converting injectors into producers;
converting producers into injectors;
changing production rates; and
drilling new wells to the reservoir.

14. The method of claim 1, wherein a quality of the velocity approximation is improved by:
calculating a special vector basis functions; and
solving a small local system for a coarse cell.

15. A method for producing a hydrocarbon from a hydrocarbon reservoir, comprising:
simulating the reservoir using a multilevel mixed multiscale finite volume method on an unstructured mesh, comprising:
constructing an interaction region;
generating a primary mesh;
computing a first algebraic multilevel basis function for a pressure, wherein the first algebraic multilevel basis function is based at least in part on a discrete harmonic function; and
computing a second algebraic multiscale basis function for a velocity approximation, wherein the basis function is solved to satisfy the following:

$$-div(v_1) = 0, \quad \text{in } K_{14}, \quad -div(v_2) = 0, \quad \text{in } K_{14},$$
$$v_1 \cdot n = 1, \quad \text{on } e_4, \quad v_2 \cdot n = 0, \quad \text{on } e_4,$$
$$v_1 \cdot n = -1, \quad \text{on } l_{12}, \quad v_2 \cdot n = 0, \quad \text{on } l_{12},$$
$$v_1 \cdot n = 0, \quad \text{on } e_1, \quad v_2 \cdot n = 1, \quad \text{on } e_1,$$
$$v_1 \cdot n = 0, \quad \text{on } l_{11}, \quad v_2 \cdot n = -1, \quad \text{on } l_{11},$$

wherein $K_{14}$ represents an interaction sub region with boundaries $e_1$, $e_4$, $l_{11}$, and $l_{12}$, and wherein basis functions $v_1$ and $v_2$ are constants when the coefficients are the same in each fine cell in the sub region $K_{14}$; and
producing a hydrocarbon from the hydrocarbon reservoir based at least in part upon the results of the simulation.

16. The method of claim 15, wherein producing the hydrocarbon comprises one or more of:
drilling one or more wells to the hydrocarbon reservoir, wherein the wells comprise production wells, injection wells, or both; and
setting production rates from the hydrocarbon reservoir.

17. A Mixed Multiscale Finite Volume Method for simulating flow in a porous media, comprising:
collecting global information about a hydrocarbon reservoir;
deriving an elliptic problem based on a saturation equation;
calculating a plurality of unstructured coarse meshes and a plurality of pressure basis functions corresponding to the plurality of unstructured coarse meshes, wherein the first algebraic multilevel basis function is based at least in part on a discrete harmonic function;
calculating a plurality of velocity basis functions corresponding to the plurality of unstructured coarse meshes to reconstruct a velocity vector field for each of the plurality of unstructured coarse meshes, wherein the basis function is solved to satisfy the following:

$$-div(v_1) = 0, \quad \text{in } K_{14}, \quad -div(v_2) = 0, \quad \text{in } K_{14},$$
$$v_1 \cdot n = 1, \quad \text{on } e_4, \quad v_2 \cdot n = 0, \quad \text{on } e_4,$$
$$v_1 \cdot n = -1, \quad \text{on } l_{12}, \quad v_2 \cdot n = 0, \quad \text{on } l_{12},$$
$$v_1 \cdot n = 0, \quad \text{on } e_1, \quad v_2 \cdot n = 1, \quad \text{on } e_1,$$
$$v_1 \cdot n = 0, \quad \text{on } l_{11}, \quad v_2 \cdot n = -1, \quad \text{on } l_{11},$$

wherein $K_{14}$ represents an interaction sub region with boundaries $e_1$, $e_4$, $l_{11}$, and $l_{12}$, and wherein the basis functions $v_1$ and $v_2$ are constants when the coefficients are the same in each fine cell in the sub region $K_{14}$; and
iterating a simulation until a final timeframe is reached, wherein the simulation comprises:
solving for a pressure and a velocity for a plurality of computational cells in each of the plurality of unstructured coarse meshes;
calculating a total velocity for each of the plurality of coarse meshes;
computing a phase velocity for each of the plurality of unstructured coarse meshes; and
computing a component transport for each of the plurality of unstructured coarse meshes;
producing a hydrocarbon from the hydrocarbon reservoir based at least in part upon the simulation.

18. The Mixed Multiscale Finite Volume Method of claim 17, further comprising combining the phase velocity computed for each of the plurality of unstructured coarse meshes to obtain a phase velocity for the hydrocarbon reservoir.

19. The Mixed Multiscale Finite Volume Method of claim 17, further combining the component transport computed for each of the plurality of coarse meshes to obtain a phase velocity for the hydrocarbon reservoir.

20. A system for simulating a hydrocarbon reservoir, comprising:
a processor;
a non-transitory storage device, wherein the storage device comprises a data representation of the hydrocarbon reservoir, wherein the data representation is an unstructured computational mesh determined by a Mixed Multiscale Finite Volume method;
a memory device, wherein the memory device comprises code to direct the processor to:
construct an interaction region;
generate a primary mesh;
compute a first algebraic multilevel basis function for a pressure, wherein the first algebraic multilevel basis function is based at least in part on a discrete harmonic function;

compute a second algebraic multiscale basis function for a velocity approximation, wherein the basis function is solved to satisfy the following:

$$\begin{aligned}
-div(v_1) = 0, &\quad \text{in } K_{14}, &\quad -div(v_2) = 0, &\quad \text{in } K_{14}, \\
v_1 \cdot n = 1, &\quad \text{on } e_4, &\quad v_2 \cdot n = 0, &\quad \text{on } e_4, \\
v_1 \cdot n = -1, &\quad \text{on } l_{12}, &\quad v_2 \cdot n = 0, &\quad \text{on } l_{12}, \\
v_1 \cdot n = 0, &\quad \text{on } e_1, &\quad v_2 \cdot n = 1, &\quad \text{on } e_1, \\
v_1 \cdot n = 0, &\quad \text{on } l_{11}, &\quad v_2 \cdot n = -1, &\quad \text{on } l_{11},
\end{aligned}$$

wherein $K_{14}$ represents an interaction sub region with boundaries $e_1$, $e_4$, $l_{11}$, and $l_{12}$, and wherein the basis functions $v_1$ and $v_2$ are constants when the coefficients are the same in each fine cell in the sub region $K_{14}$;

simulate the hydrocarbon reservoir using the primary mesh; and update the data representation based at least in part on the results of the simulation.

21. The system of claim 20, wherein the processor comprises a multi-processor cluster.

* * * * *